US012643824B2

(12) United States Patent (10) Patent No.: US 12,643,824 B2

Tan et al. (45) Date of Patent: Jun. 2, 2026

(54) BUILDING MATERIALS AND COMPONENTS AND METHODS OF MAKING THE SAME

(71) Applicant: UNIVERSITY OF WYOMING, Laramie, WY (US)

(72) Inventors: Gang Tan, Laramie, WY (US); Tengyao Jiang, Laramie, WY (US); Jennifer Tanner Eisenhauer, Laramie, WY (US); Richard Horner, Laramie, WY (US)

( * ) Notice: Subject to any disclaimer, the term of this patent is extended or adjusted under 35 U.S.C. 154(b) by 0 days.

(21) Appl. No.: 18/411,960

(22) Filed: Jan. 12, 2024

(65) Prior Publication Data

US 2024/0150245 A1 May 9, 2024

Related U.S. Application Data

(63) Continuation of application No. 16/999,413, filed on Aug. 21, 2020, now Pat. No. 11,891,337.

(Continued)

(51) Int. Cl.
*C04B 33/04* (2006.01)
*C03C 11/00* (2006.01)
(Continued)

(52) U.S. Cl.
CPC ............ *C04B 33/04* (2013.01); *C03C 11/007* (2013.01); *C04B 14/06* (2013.01); *C04B 22/02* (2013.01);
(Continued)

(58) Field of Classification Search
CPC .......... C10G 1/04; C10G 1/045; C10B 53/04; C10B 57/08; C03C 1/002; C03C 11/007;
(Continued)

(56) References Cited

U.S. PATENT DOCUMENTS

| | | | |
|---|---|---|---|
| 4,097,361 A | 6/1978 | Ashworth | |
| 2020/0332197 A1* | 10/2020 | Ackerman | ............... C10G 1/06 |

FOREIGN PATENT DOCUMENTS

| | | |
|---|---|---|
| CN | 102515551 A | 6/2012 |
| JP | 2004269340 A | 9/2004 |

OTHER PUBLICATIONS

Office Action for U.S. Appl. No. 16/999,413 dated Dec. 7, 2022.

* cited by examiner

*Primary Examiner* — Shuangyi Abu Ali

(74) *Attorney, Agent, or Firm* — Patterson + Sheridan, LLP

(57) ABSTRACT

Embodiments of the present disclosure generally relate to methods and materials for fabricating building materials and other components from coal. More specifically, embodiments of the present disclosure relate to materials and other components, such as char clay plaster, char brick, and foam glass fabricated from coal, and to methods of forming such materials. In an embodiment is provided a building material fabrication method. The method includes mixing an organic solvent with coal, under solvent extraction conditions, to form a coal extraction residue, and heating the coal extraction residue under pyrolysis conditions to form a pyrolysis char, the pyrolysis conditions comprising a temperature greater than about 500° C. The method further includes mixing the pyrolysis char with water and with one or more of clay, cement, or sand to create a mixture, and molding and curing the mixture to form a building material. Pyrolysis char-containing materials are also disclosed.

28 Claims, 19 Drawing Sheets

Related U.S. Application Data

(60) Provisional application No. 62/891,539, filed on Aug. 26, 2019.

(51) Int. Cl.

| | | |
|---|---|---|
| *C04B 14/06* | (2006.01) |
| *C04B 22/02* | (2006.01) |
| *C04B 28/02* | (2006.01) |
| *C10B 53/04* | (2006.01) |
| *C04B 103/46* | (2006.01) |
| *C04B 111/00* | (2006.01) |

(52) U.S. Cl.
CPC .............. *C04B 28/02* (2013.01); *C10B 53/04* (2013.01); *C04B 2103/465* (2013.01); *C04B 2111/00482* (2013.01); *C04B 2201/20* (2013.01)

(58) Field of Classification Search
CPC ....... C04B 14/022; C04B 14/06; C04B 14/24; C04B 20/002; C04B 20/023; C04B 20/04; C04B 2103/465; C04B 2111/00258; C04B 2111/00482; C04B 2111/28; C04B 2111/52; C04B 22/02; C04B 2201/20; C04B 2201/32; C04B 2201/50; C04B 28/001; C04B 28/02; C04B 30/00; C04B 33/04; C04B 33/135; C04B 33/32; C04B 40/0028; C04B 40/0281; Y02P 40/60
See application file for complete search history.

FG-2

FG-4

Sieve No. 30, PZ < 0.6 mm

Sieve No. 16, 0.6 mm < PZ < 1.18 mm

CB-0.6

CB-1.18

BUILDING MATERIALS AND COMPONENTS AND METHODS OF MAKING THE SAME

CROSS-REFERENCE TO RELATED APPLICATIONS

This application is a continuation of U.S. patent application Ser. No. 16/999,413 filed on Aug. 21, 2020, which claims priority to U.S. Provisional Patent Application Ser. No. 62/891,539 filed on Aug. 26, 2019, both of which are incorporated herein by reference in their entirety.

BACKGROUND

Field

Embodiments of the present disclosure generally relate to methods and materials for fabricating building materials and other components from coal. More specifically, embodiments of the present disclosure relate to materials and other components, such as char clay plaster, char brick, and foam glass fabricated from coal, and to methods of forming such materials.

Description of the Related Art

Coal, which includes various material compositions with different reaction characteristics, is a limited and nonrenewable source on earth. Coal continues to play an important role in industrial demand and everyday living, irrespective of the decreased coal production and coal consumption brought about by the rise of renewable energy. The direct combustion of coal through a fire-powered plant not only wastes hydrogen-rich volatile matter but also gives rise to pollution. Carbon dioxide, which originates largely from coal combustion, has been identified as a trigger for global environmental issues, including climate change. Aside from carbon, sulfur and nitrogen released during the burning of coal can contribute to smog and acid rain. Therefore, unless equipped with carbon-capture technology and a ready utilization route such as below ground storage or conversion into a carbon sink product, the use of coal in its raw form does not meet today's desire for clean energy production.

The refining of coal produces valuable components including synthesis gas, pitch, liquid oil, and char has been extensively studied. Coal, as a carbon-rich solid, acts as a starting material for fabricating valuable products via a refinery conversion process. A staged coal-conversion utilization technology has been previously investigated which involves the pyrolysis of coal to produce volatiles and pyrolysis char, followed by the separation of volatiles for pyrolysis gas and tar. The tar is an important source of aromatic compounds such as phenol, benzene, and toluene. A so-called flash hydropyrolysis has then been explored to increase the tar yield during coal conversion. The pyrolysis gas includes $H_2$, CO, and hydrocarbons can be used for fuel production and/or chemical synthesis, and the pyrolysis char can be used for combustion and/or further gasification. Nevertheless, the environmental impacts of producing char cannot easily be eliminated through the sole application of combustion, gasification, or pyrolysis, especially related to fossil-derived $CO_2$ emissions.

It is reported that buildings account for as much as 40% of the energy consumption in the United States, and as high as half of the space heating and cooling energy is lost through building envelopes. Thus, improvement of the thermal insulation property, which is equivalent to reducing thermal conductivity, in building facades such as walls is one approach to decreasing energy consumption induced by building envelopes.

One approach to reducing weight, reducing thermal conductivity, and enhancing noise abatement in building materials is to create pores on and/or within the building materials. A wide range of porous materials or materials having the ability of creating pores have been utilized for the fabrication of heat-insulating building materials such as polyurethane foam, silica gel granules, recycled paper, alumina foam, and expanded polystyrene foam. Amongst these materials, however, it is worthwhile to note that chemically induced pore generation, involving high-temperature swelling or highly-purified reagents, are not cost effective. Further these materials are manufactured in a way that releases carbon dioxide into the atmosphere.

Therefore, there is a need for improved building materials derived from coal, such as char clay plaster, char brick, and foam glass, and methods of fabrication thereof.

SUMMARY

Embodiments of the present disclosure generally relate to methods and materials for fabricating building materials and other components from coal. More specifically, embodiments of the present disclosure relate to materials and other components, such as char clay plaster, char brick, and foam glass fabricated from coal, and to methods of forming such materials. Such materials can be manufactured using thermo-chemical processing that does not liberate anthropogenic carbon dioxide.

In an embodiment is provided a method of forming a building component. The method includes mixing an organic solvent with coal, under solvent extraction conditions, to form a coal extraction residue, and heating the coal extraction residue under pyrolysis conditions to form a pyrolysis char, the pyrolysis conditions comprising a temperature greater than about 500° C. The method further includes mixing the pyrolysis char with water and with one or more of clay, cement, or sand to create a mixture, and molding and curing the mixture to form a building component.

In another embodiment is provided a building material. The building material includes a mixture of pyrolysis char, water, and one or more of clay, cement, or sand, wherein when the mixture comprises clay and sand: cement is present in the mixture in a first amount of about 10 wt % to about 40 wt %, based on a total weight percent of cement, sand, pyrolysis char, and water; and the water, sand, and pyrolysis char are present in the mixture in a second amount of about 60 wt % to about 90 wt %, based on the total weight percent of cement, sand, pyrolysis char, and water, wherein the total weight percent does not exceed 100 wt %.

In another embodiment is provided a method of forming a building material. The method includes mixing an organic solvent with coal, under solvent extraction conditions, to form a coal extraction residue, and heating the coal extraction residue under pyrolysis conditions to form a pyrolysis char, the pyrolysis conditions comprising a temperature greater than about 500° C. The method further includes calcining the pyrolysis char, under first effective calcination conditions, to form coal ash, mixing the coal ash with glass powder, a foaming agent, a foaming stabilizer, and water to form a mixture, and calcining the mixture, under second effective calcination conditions, to form the building material.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limited of its scope, and may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Figure 1:
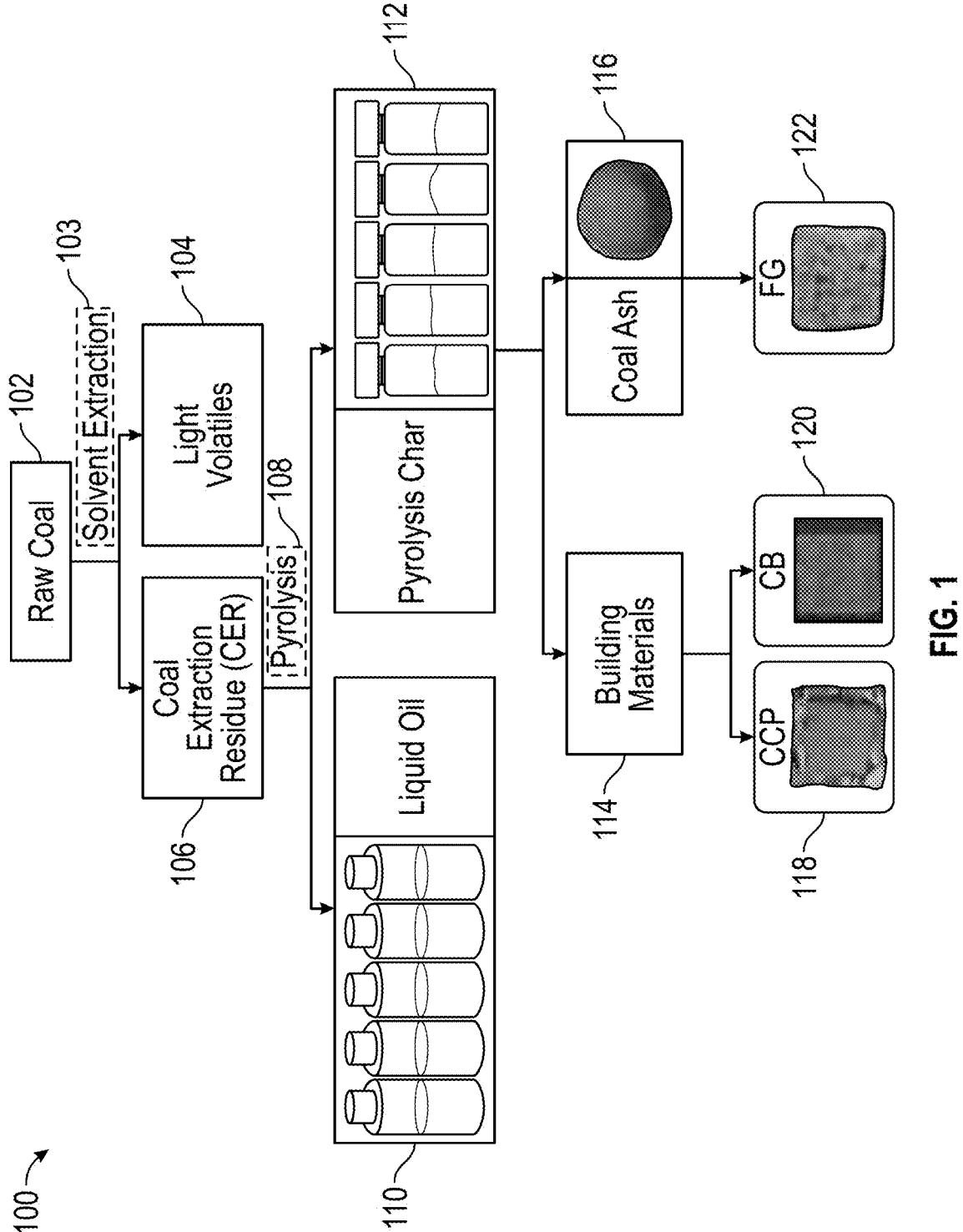
FIG. 1 illustrates an example schematic processing chart for the comprehensive reuse of char in the fabrication of building materials according to at least one embodiment of the present disclosure.

Embodiments of the present disclosure generally relate to methods and materials for fabricating building materials and other components from coal. More specifically, embodiments of the present disclosure relate to materials and other components, such as char clay plaster, char brick, and foam glass fabricated from coal, and to methods of forming such materials. Manufacturing these and other products by methods described herein will result in a new building material development method without liberating anthropogenic carbon dioxide into the atmosphere. The components described herein can be used as building materials or transformed to building materials.

The inventors have found new and improved methods and materials for fabricating building materials from raw coal. Briefly, raw coal is thermo-chemically converted to produce chemically-stable pyrolysis char at elevated temperatures, e.g., above about 500° C., without liberating anthropogenic carbon dioxide, and the resulting pyrolysis char is then converted to a variety of building materials such as char clay plaster, char brick, and foam glass. The comprehensive production and reuse of the pyrolysis chars, as described herein, is an alternative for fabricating, e.g., insulative porous carbon-based materials. Embodiments described herein can provide a clean-production technique for the conversion of coal and the creation of a series of valuable products including, e.g., pyrolysis char, light volatiles, and liquid oils that are co-produced via an integrated solvent extraction and high-temperature pyrolysis process (thermo-chemical processing). The composition of pyrolysis char and its impact in char clay plaster and char bricks provides a novel and economical approach for fabricating insulating building materials in building and construction applications in an environmentally friendly manner. As such, the materials and methods described herein enable the use of pyrolysis chars produced without liberating anthropogenic carbon dioxide for the fabrication of building materials.

The desire for environmentally-friendly materials, energy savings, and reduced energy consumption in building materials can be addressed by the building materials described herein. The building materials described herein have, e.g., reduced thermal conductivity, enhanced noise abatement, and light-weight characteristics relative to conventional building materials. In some examples, pores on and/or within the building materials described herein can act to reduce the bulk density and thermal conductivity of the materials. In addition, and in some examples, the building materials show improved performance in terms of responsiveness to water and/or moisture. Accordingly, and in some embodiments, the building materials described herein can be used when moisture adjustment of the indoor environment is desired to, e.g., create an indoor environmental comfort level improvement in terms of relative humidity control.

In an embodiment, pyrolysis char is utilized as an alternative starting material for the fabrication of building materials. The as-fabricated building materials demonstrate not only enhanced insulation and noise abatement properties, but are also light weight and exhibit moisture-buffering features which can be utilized for humidity regulation in an indoor environment. In some embodiments, the porous nature of the building materials described herein has been obtained by advantageously incorporating pyrolysis char and conventional chemical pore-creating/swelling procedures are eliminated. According to the evaluation of $CO_2$ footprint using a quantification of $CO_2$ emission and mass-balance approach, the carbon in pyrolysis char is entirely captured and performs as an insulating building material, leading to this coal conversion process satisfying industrial clean production requirements and meeting the strict compliance requirements for environmentally-friendly building materials. At the end of its life, the building materials can be, e.g., recycled, pulverized, and/or reduced to soil amendment rather than landfilling. Thus, the environmental issues caused by the $CO_2$ emissions are eliminated, from the point of primary coal processing through the production of the building materials themselves, or at least mitigated, through the incorporation of carbon in building materials according to the embodiments described herein.

FIG. 1 illustrates an example process 100 for the comprehensive conversion of raw coal to a variety of products according to at least one embodiment of the present disclosure. The conversion of raw coal described herein does not liberate any anthropogenic carbon dioxide, constituting a clean and environmentally-friendly production technique. As shown, and in some embodiments, the raw coal is converted to, e.g., light volatiles 104, coal extraction residue 106, liquid oils 110, and pyrolysis char 112. Further, the pyrolysis char 112 is used in the fabrication of building materials such as char clay plaster 118, char brick 120, and foam glass 122. Although foam glass can be used as a building material, it can also be used for other applications such as pipe insulation.

As used herein, "coal extraction residue" and "CER" are used interchangeably; "pyrolysis char" and "PC" are used interchangeably; "char clay plaster" and "CCP" are used interchangeably; "char brick" and "CB" are used interchangeably; and "foam glass" and "FG" are used interchangeably.

The process 100 begins with solvent extraction 103 of raw coal 102 using an organic solvent, under solvent extraction conditions, to obtain solvent extraction products. Such solvent extraction products can include light volatiles 104 and coal extraction residue (CER) 106. The light volatiles 104 and CER 106, together with other extracts and deposits produced and employing further separation techniques, can be used as chemical feedstocks or used to make other engineered products such as soil amendments, asphalt paving and roofing products, silicon carbide, carbon fiber, graphene oxide, polymeric resins, and coatings For the solvent extraction 103, an organic solvent, e.g., tetralin, is mixed with raw coal and the resulting mixture is subjected to solvent extraction conditions. The solvent extraction conditions include heating and/or maintaining the mixture at a temperature of about 300° C. to about 400° C., such as from about 310° C. to about 390° C., such as from about 320° C. to about 380° C., such as from about 330° C. to about 370° C., such as from about 340° C. to about 360° C., such as about 350° C. or about 360° C.; a pressure from about 200 psi to about 300 psi, such as from about 210 psi to about 290 psi, such as from about 220 psi to about 280 psi, such as from about 230 psi to about 270 psi, such as from about 240 psi to about 260 psi, such as about 250 psi; and/or a time period of about 30 minutes (min.) or more, such as from about 1 hour (h) to about 10 h, such as from about 2 h to about 5 h, such as about 3 h or about 4 h.

The solvent extraction conditions further include a flow rate of organic solvent being introduced to the raw coal. The flow rate of organic solvent, per gram of dried coal, is about 0.03 mL/min or more, such as from about 0.05 mL/min to about 5 mL/min, such as from about 0.075 mL/min to about 2 mL/min, such as about 0.1 mL/min to about or about 0.175 mL/min, such as from about 0.125 mL/min to about 0.15 mL/min. In at least one embodiment, the flow rate of the organic solvent, per gram of dried coal, is about 0.1 mL/min.

Non-limiting examples of organic solvents useful for the solvent extraction 103 include, but are not limited to, tetralin, aromatic solvents, polar solvents, amines, non-ionic liquids, other hydrogen donating liquids, or a combination thereof.

In some embodiments, the CER 106 is subjected to pyrolysis 108, under pyrolysis conditions, to form pyrolysis products. Such pyrolysis products include liquid oil 110 and pyrolysis char 112. The pyrolysis reaction is performed in any suitable reactor such as a fixed-bed reactor, a fluidized-bed reactor, a spouted fluid-bed reactor, a transported-bed reactor, a kiln, a rotating kiln, a circulating fluidized-bed reactor, a rotating cone reactor, an entrained flow reactor, an auger or screw reactor, a plasma pyrolysis reactor, a vortex centrifuge reactor, a vacuum reactor, a PyRos reactor (a type of flash pyrolysis reactor), or an ablative reactor.

Pyrolysis conditions include using a non-reactive gas atmosphere (e.g., nitrogen and/or argon); and/or a temperature of about 450° C. or more, such as from about 450° C. to about 1,000° C., such as from about 500° C. to about 1,000° C., such as from about 500° C. to about 900° C., such as from about 600° C. to about 800° C. or from about 700° C. to about 800° C. In at least one embodiment, the temperature for the pyrolysis 108 ranges from $T_1$ to $T_2$, where $T_1$ and $T_2$ are, independently, about 450° C., about 460° C., about 470° C., about 480° C., about 490° C., about 500° C., about 510° C., about 520° C., about 530° C., about 540° C., about 550° C., about 560° C., about 570° C., about 580° C., about 590° C., about 600° C., about 610° C., about 620° C., about 630° C., about 640° C., about 650° C., about 660° C., about 670° C., about 680° C., about 690° C., about 700° C., about 710° C., about 720° C., about 730° C., about 740° C., about 750° C., about 760° C., about 770° C., about 780° C., about 790° C., about 800° C., about 810° C., about 820° C., about 830° C., about 840° C., about 850° C., about 860° C., about 870° C., about 880° C., about 890° C., about 900° C., about 910° C., about 920° C., about 930° C., about 940° C., or about 950° C., as long as $T_1 < T_2$.

Pyrolysis conditions further include a pressure of about 1.1 atm or less, such as about 1.0 atm or less, such as about 0.95 atm or less, such as about 0.90 atm or less, such as about 0.85 atm or less, such as about 0.80 atm or less, such as about 0.75 atm or less.

Following pyrolysis, the liquid oil 110 can be collected and separated before further processing to make petrochemicals or engineered materials such as asphalt paving, asphalt roofing, base oils, carbon fiber, polymeric resins, and coatings. The liquid oil 110 contains valuable organic compounds, to make these aforementioned products and other compounds such as cresol, phenols, and other carbonaceous materials. Resulting from the polymerization characteristics of aromatic compounds under high-temperature pyrolysis, the liquid oil 110 is also manufactured as an economic co-product of the pyrolysis char production without liberating anthropogenic carbon dioxide.

In some embodiments, the pyrolysis char 112 has one or more of the following characteristics:

(1) a BET specific surface area of about 50 m² g⁻¹ or more, such as from about 75 m² g⁻¹ to about 500 m² g⁻¹, such as from about 100 m² g⁻¹ to about 400 m² g⁻¹, such as from about 125 m² g⁻¹ to about 300 m² g⁻¹, such as from about 150 m² g⁻¹ to about 250 m² g⁻¹, such as from about 175 m² g⁻¹ to about 225 m² g⁻¹. In at least one embodiment, the BET specific surface area of the pyrolysis char, when formed at a pyrolysis temperature of about 500° C. to about 1000° C., ranges from $SA_1$ to $SA_2$, where $SA_1$ to $SA_2$ (in units of m² g⁻¹) are, independently, about 200, about 205, about 210, about 215, about 220, about 225, about 230, about 235, about 240, about 245, about 250, about 255, about 260, about 265, about 270, about 275, about 280, about 285, about 290, about 295, or about 300, so long as $SA_1 < SA_2$. In some embodiments, the pyrolysis char has a lower BET specific surface area than that of the CER from which it is derived.

(2) an average pore channel size of about 1.0 nm or more, such as from about 1.5 nm to about 50 nm, such as from about 2.0 nm to about 30 nm, such as from about 5.0 nm to about 20 nm, such as from about 8.0 nm to about 10 nm, measured by nitrogen adsorption porosimeter.

(3) an oxygen to carbon (O:C) molar ratio of about 0.10 or more, such as from about 0.10 to about 0.40, such as from about 0.14 to about 0.30, such as from about 0.18 to about 0.20. The O:C molar ratio is determined by the ultimate analysis data using MACRO Cube elemental analyzer.

Returning to FIG. 1, the unique properties of pyrolysis char 112 enable pyrolysis char 112 to perform as a starting material for the preparation of insulating building materials 114. The products from pyrolysis char described herein, including char clay plaster 118 and char brick 120, exhibit unique features (e.g., moisture adjustment and improved insulation properties) in comparison to conventional counterparts. Additionally, the porous characteristics of pyrolysis char 112 are believed to increase sound absorption within certain building materials because sound energy dissipates within the interconnected pore networks created by the addition of pyrolysis char. For example, char utilized as a concrete filler results in the concrete having a high sound absorption coefficient across a range of 200-2000 Hz. Also, the porosity characteristics of pyrolysis char modified concrete are believed to be beneficial to the absorption of electromagnetic radiation. In addition, pyrolysis char enables carbon capture and storage within a building material which is utilized to reduce the overall carbon footprint of structures fabricated with building materials fabricated according to the embodiments described herein. Coal ash 116 and foam glass 122 are also made from pyrolysis char 112 as described herein.

In some embodiments, the pyrolysis char 112 is calcined under effective calcination conditions to form coal ash 116 by calcining the pyrolysis char 112. Effective calcination conditions include, but are not limited to, a temperature from about 600° C. to about 1200° C., such as from about 700° C. to about 1100° C., such as from about 800° C. to about 1000° C., such as from about 900° C. to about 950° C.; a time period of about 0.5 h to about 24 h, such as from about 1 h to about 10 h, such as from about 2 h to about 5 h; and/or a pressure of about 1.1 atm or less, such as about 1.0 atm or less, such as about 0.95 atm or less, such as about 0.90 atm or less, such as about 0.85 atm or less, such as about 0.80 atm or less, such as about 0.75 atm or less. The pyrolysis char can be calcined in an atmosphere containing about 5 vol % to about 30 vol % $O_2$.

In some embodiments, char clay plaster 118 is fabricated according to the following method. A slurry is made by introducing clay to water followed by mixing. A weight ratio of clay to water used to make the slurry is at least about 0.30, such as from about 0.35 to about 0.80, such as from about 0.40 to about 0.70, such as from about 0.45 to about 0.60. After a period of time (e.g., at least about 1 h, such as from about 5 h to about 48 h, such as from about 10 h to about 40 h, such as from about 20 h to about 30 h, such as about 24 h), pyrolysis char, sand, and water are introduced to the slurry to form the CCP. The CCP can then be molded to a specific shape and dried at about room temperature.

The amount of pyrolysis char used to make the char clay plaster 118 is at least about 5 wt %, such as from about 10 wt % to about 90 wt %, such as from about 15 wt % to about 85 wt %, such as from about 20 wt % to about 80 wt %, such as from about 25 wt % to about 75 wt %, such as from about 30 wt % to about 70 wt %, such as from about 35 wt % to about 65 wt %, such as from about 40 wt % to about 60 wt %, such as from about 45 wt % to about 55 wt %, such as about 40 wt %, 50 wt %, or 60 wt %, based on the total weight percent of total aggregates (e.g., sands and pyrolysis chars), wherein the total weight percent does not exceed 100 wt %.

The amount of sand used to make the char clay plaster 118 is at least about 20 wt %, such as from about 25 wt % to about 80 wt %, such as from about 35 wt % to about 70 wt %, such as from about 40 wt % to about 60 wt %, such as from about 45 wt % to about 50 wt %, based on the total weight percent of total aggregates, wherein the total weight percent does not exceed 100 wt %.

The weight ratio of water to the total aggregates (e.g., sands and pyrolysis chars) used to make the char clay plaster 118 from the slurry is at least about 0.50, such as from about 0.55 to about 1.0, such as from about 0.60 to about 0.90, such as from about 0.65 to about 0.80, such as from about 0.70 to about 0.75.

In some embodiments, and when the char clay plaster includes clay and sand, the clay is present in the mixture in a first amount of about 5 wt % to about 30 wt %, based on a total weight percent of clay, sand, pyrolysis char, and water; and one or more of the pyrolysis char, the water, and the sand is present in the mixture in a second amount of about 70 wt % to about 95 wt %, based on the total weight percent of clay, sand, pyrolysis char and water, wherein the total weight percent does not exceed 100 wt %. In at least one embodiment, the second amount includes or further includes about 33 wt % water when a weight ratio of the pyrolysis char to sand is about 4:6, or the second amount includes or further includes about 36 wt % water when a weight ratio of the pyrolysis char to sand is about 1:1, or the second amount includes or further includes about 38 wt % water when a weight ratio of the pyrolysis char to sand is about 6:4

In some embodiments, the char clay plaster 118 has one or more of the following characteristics:

(1) A BET specific surface area that is at least about 45 $m^2$ $g^{-1}$, such as from about 50 $m^2$ $g^{-1}$ to about 500 $m^2$ $g^{-1}$, such as from about 65 $m^2$ $g^{-1}$ to about 400 $m^2$ $g^{-1}$, such as from about 80 $m^2$ $g^{-1}$ to about 300 $m^2$ $g^{-1}$, such as from about 100 $m^2$ $g^{-1}$ to about 200 $m^2$ $g^{-1}$, measured by a Quantachrome Autosorb IQ automated gas sorption analyzer.

(2) A bulk density that is at least about 0.40 g $cm^{-3}$, such as from about 0.50 g $cm^{-3}$ to about 1.50 g $cm^{-3}$, such as from about 0.60 g $cm^{-3}$ to about 1.20 g $cm^{-3}$, such as from about 0.70 g $cm^{-3}$ to about 0.90 g $cm^{-3}$. In some embodiments, the bulk density is less than about 1.2 g $cm^{-3}$, such as about 1.0 g $cm^{-3}$ or less, such as about 0.50 g $cm^{-3}$ or less. The bulk density is obtained from the mass/volume ratio of the CCP samples.

(3) A thermal conductivity that is less than about 0.65 W $m^{-1}$ $K^{-1}$, such as less than about 0.5 W $m^{-1}$ $K^{-1}$, such as less than about 0.45 W $m^{-1}$ $K^{-1}$, such as less than about 0.4 W $m^{-1}$ $K^{-1}$, such as less than about 0.35 W $m^{-1}$ $K^{-1}$, such as less than about 0.3 W $m^{-1}$ $K^{-1}$, such as less than about 0.28 W $m^{-1}$ $K^{-1}$, such as less than about 0.25 W $m^{-1}$ $K^{-1}$, such as less than about 0.2 W $m^{-1}$ $K^{-1}$, such as less than about 0.18 W $m^{-1}$ $K^{-1}$. The thermal conductivity of the specimen is measured by a heat flow meter-Hot Disk TPS 1500.

A moisture absorption capacity that is at least about 0.05 g $H_2O$/g CCP at 75% relative humidity (RH) for 24 hours, such as from about 0.06 g $H_2O$/g CCP to about 0.20 g $H_2O$/g CCP at 75% RH for 24 hours, such as from about 0.07 g $H_2O$/g CCP to about 0.15 g $H_2O$/g CCP at 75% RH for 24 hours, such as from about 0.10 g $H_2O$/g CCP to about 0.12 g $H_2O$/g CCP at 75% RH for 24 hours. Moisture absorption is measured using a temperature and relative humidity-controlled chamber and a balance.

In some embodiments, char brick 120 is fabricated according to the following method. The method includes introducing pyrolysis char, sand, and cement to water. The resultant mixture was mixed and then cured in, e.g., a mold. In some embodiments, the curing process includes curing in a shady environment (e.g., indoor environment) with a temperature that is from about 25° C. to about 45° C., and a relative humidity of about 70% or more.

The amount of pyrolysis char used to make the char brick 120 is at least about 5 wt %, such as from about 10 wt % to about 80 wt %, such as from about 15 wt % to about 75 wt %, such as from about 20 wt % to about 70 wt %, such as from about 25 wt % to about 65 wt %, such as from about 30 wt % to about 60 wt %, such as from about 35 wt % to about 55 wt %, such as from about 40 wt % to about 50 wt %, such as about 40 wt %, 45 wt % or about 50 wt %, based on the total weight percent of pyrolysis char and sand, wherein the total weight percent does not exceed 100 wt %.

The amount of sand used to make the char brick 120 is at least about 20 wt %, such as from about 25 wt % to about 95 wt %, such as from about 30 wt % to about 85 wt %, such as from about 35 wt % to about 75 wt %, such as from about 40 wt % to about 65 wt %, such as from about 45 wt % to about 55 wt %, such as about 50 wt %, based on the total weight percent of pyrolysis char and sand, wherein the total weight percent does not exceed 100 wt %.

The amount of cement used to make the char brick 120 is at least about 10 wt %, such as from about 15 wt % to about 40 wt %, such as from about 20 wt % to about 35 wt %, such as from about 25 wt % to about 30 wt %, based on the total weight percent of pyrolysis char, sand, and cement, wherein the total weight percent does not exceed 100 wt %.

In some embodiments, the char brick 120 is a mixture of pyrolysis char, water, and one or more of clay, cement, or sand, wherein when the mixture comprises clay and sand: cement is present in the mixture in a first amount of about 10 wt % to about 40 wt %, based on a total weight percent of cement, sand, pyrolysis char, and water; and the water, sand, and pyrolysis char are present in the mixture in a second amount of about 60 wt % to about 90 wt %, based on the total weight percent of cement, sand, pyrolysis char, and water, wherein the total weight percent does not exceed 100 wt %. In at least one embodiment, the second amount includes or further includes about 26 wt % water when a weight ratio of the pyrolysis char to sand is about 3:7, the second amount includes or further includes about 31 wt % water when a weight ratio of the pyrolysis char to sand is about 4:6, or the second amount includes or further includes about 36 wt % water when a weight ratio of the pyrolysis char to sand is about 1:1.

In some embodiments, the char brick 120 has one or more of the following characteristics:

(1) A bulk density of less than about 2 g cm$^{-3}$, such as less than about 1.9 g cm 3, such as less than about 1.8 g cm$^{-3}$, such as less than about 1.7 g cm$^{-3}$, such as less than about 1.6 g cm$^{-3}$, such as less than about 1.5 g cm$^{-3}$, such as less than about 1.4 g cm$^{-3}$, such as less than about 1.3 g cm$^{-3}$, such as less than about 1.2 g cm$^{-3}$. The bulk density is obtained from the mass/volume ratio of the CCP samples.

(2) A thermal conductivity of less than about 1 W m$^{-1}$ K$^{-1}$, such as less than about 0.9 W m$^{-1}$ K$^{-1}$, such as less than about 0.8 W m$^{-1}$ K$^{-1}$, such as less than about 0.7 W m$^{-1}$ K$^{-1}$, such as less than about 0.6 W m$^{-1}$ K$^{-1}$, such as less than about 0.5 W m$^{-1}$ K$^{-1}$. The thermal conductivity of the specimen is measured using a heat flow meter-Hot Disk TPS 1500.

(3) A compressive strength of about 6 MPa or more, such as from about 7 MPa to about 30 MPa, such as from about 10 MPa to about 20 MPa, such as from about 12 MPa to about 15 MPa. Compressive strength is determined by loading the specimens under displacement control until failure. The instrument is a Zwick Roell Z020 material testing system.

(4) A moisture absorption of about 0.01 g H$_2$O/g CB or more at 75% RH for 24 hours, such as from about 0.01 g H$_2$O/g CB to about 0.1 g H$_2$O/g CB at 75% RH for 24 hours, such as from about 0.03 g H$_2$O/g CB to about 0.07 g H$_2$O/g CB at 75% RH for 24 hours. Moisture absorption is measured using a temperature and relative humidity-controlled chamber and a balance.

(5) A sound absorption coefficient that is about 0.2 to about 0.3 for a 40 mm thick sample.

Figure 2A:
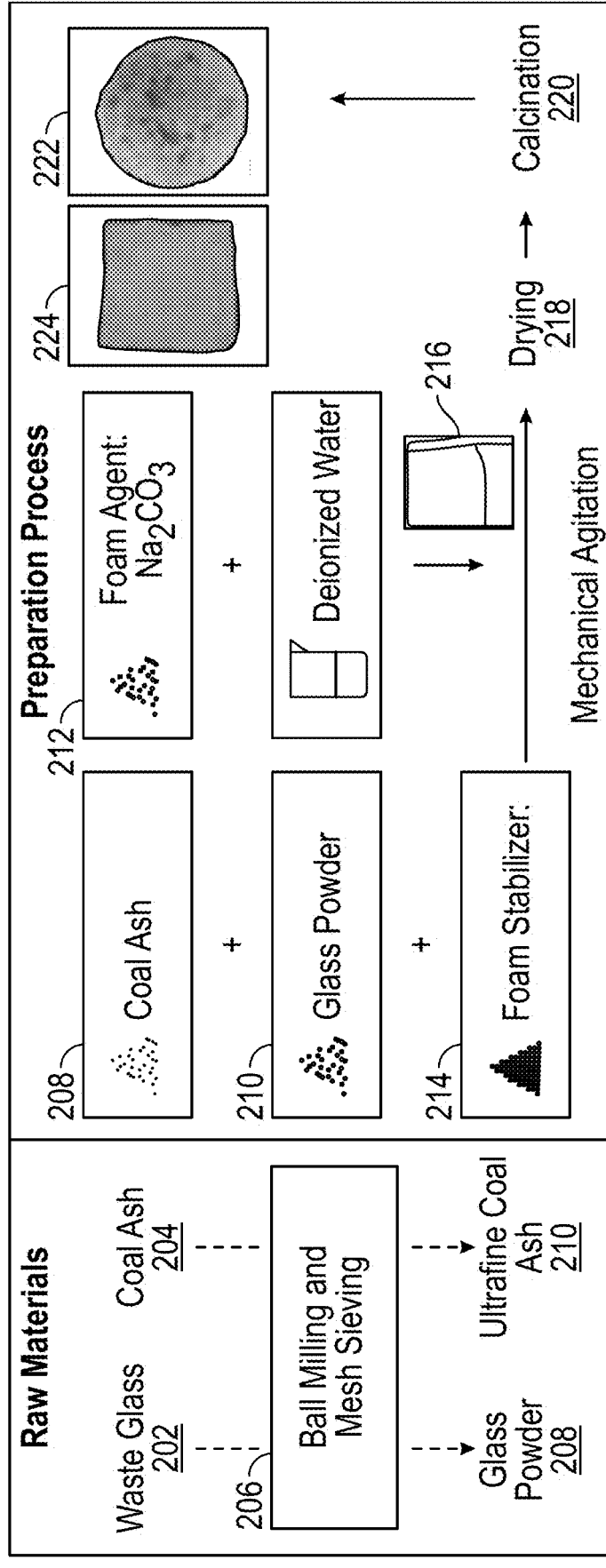
FIG. 2A is a schematic illustrating an overview of an example process for making foam glass according to at least one embodiment of the present disclosure.

FIG. 2A illustrates a schematic overview of an example process 200 for forming foam glass according to at least one embodiment of the present disclosure. Foaming agent(s) 212 utilized to make the foam glass include, but are not limited to, sodium carbonate (Na$_2$CO$_3$), sodium silicate, sodium hydroxide, calcium carbonate, or a combination thereof. Foaming stabilizer(s) 214 utilized to make the foam glass include, but are not limited to, sodium phosphate (Na$_3$PO$_4$), monosodium phosphate (NaH$_2$PO$_4$), sodium hydrogen phosphate (Na$_2$HPO$_4$), or a combination thereof.

In one embodiment, the foam glass is fabricated from waste glass 202 and coal ash 204. In another embodiment, the coal ash is made from pyrolysis chars 112 by subjecting the pyrolysis char 112 to the calcination conditions discussed above. The waste glass is pulverized using, e.g., ball milling 206 (planetary ball mill; 100 or 200 sieve meshing) to form glass powder 208 having a size of about 60 μm or less, such as about 50 μm or less. The coal ash is also pulverized using, e.g., ball milling 206 (planetary ball mill; 100 or 200 sieve mesh) to form an ultrafine coal ash 210 having a size of about 60 μm or less, such as about 50 μm or less. Glass powder 208, coal ash 210, foaming agent 212, foaming stabilizer 214, and water (e.g., distilled water) are mixed at about room temperature using agitation, e.g., mechanical agitation, to form an initial foam glass 216.

The amount of glass powder 208 used to make the initial foam glass 216 is from about 0 wt % to about 80 wt %, such as from about 5 wt % to about 75 wt %, such as from about 10 wt % to about 70 wt %, such as from about 15 wt % to about 65 wt %, such as from about 20 wt % to about 60 wt %, such as from about 25 wt % to about 55 wt %, such as from about 30 wt % to about 50 wt %, such as from about 35 wt % to about 45 wt %, based on the total weight percent of the glass powder, coal ash, foaming agent, and foaming stabilizer, wherein the total weight percent does not exceed 100 wt %.

The amount of coal ash 210 used to make the initial foam glass 216 is from about 20 wt % to about 40 wt %, such as from about 22 wt % to about 38 wt %, such as from about 24 wt % to about 36 wt %, such as from about 25 wt % to about 35 wt %, such as from about 26 wt % to about 34 wt %, such as from about 28 wt % to about 32 wt %, based on the total weight percent of the glass powder, coal ash, foaming agent, and foaming stabilizer, wherein the total weight percent does not exceed 100 wt %.

The amount of foaming agent 212 used to make the initial foam glass 216 is from about 2 wt % to about 5 wt %, such as from about 2.5 wt % to about 4.5 wt %, such as from about 3 wt % to about 4 wt %, based on the total weight percent of the glass powder, coal ash, foaming agent, and foaming stabilizer, wherein the total weight percent does not exceed 100 wt %.

The amount of foaming stabilizer 214 used to make the initial foam glass 216 is from about 2 wt % to about 5 wt %, such as from about 2.5 wt % to about 4.5 wt %, such as from about 3.0 wt % to about 4.0 wt %, such as about 3.25 wt % to about 3.5 wt % or from about 3.5 wt % to about 3.75 wt %, based on the total weight percent of the glass powder, coal ash, foaming agent, and foaming stabilizer, wherein the total weight percent does not exceed 100 wt %.

The amount of water used to make the initial foam glass 216 is an amount sufficient to enable mixing of the glass powder, coal ash, foaming agent, and foaming stabilizer, such as about 100 g of coal ash per 1 Liter of water (1 L H$_2$O), such as from about 200 g coal ash/1 L H$_2$O to about 800 g coal ash/1 L H$_2$O, such as from about 300 g coal ash/1 L H$_2$O to about 500 g coal ash/1 L H$_2$O.

Following agitation, the initial foam glass 216 (which can have dimensions of, e.g., 50 mm×40 mm×20 mm) is then subjected to drying 218, under effective drying conditions, and/or subjected to calcination 220, under effective calcination conditions, to form the foam glass product 222, 224. Each foam glass product 222, 224 has different foaming agent loadings. Drying conditions include drying the initial foam glass 216 to form a dried foam glass at a temperature from about 100° C. or more, such as from about 100° C. to about 200° C., such as from about 110° C. to about 190° C., such as from about 120° C. to about 180° C., such as from about 130° C. to about 170° C., such as from about 140° C. to about 160° C., such as from about 145° C. to about 155° C., such as about 150° C.; a pressure of about 1.1 atm or less, such as about 1.0 atm or less, such as about 0.95 atm or less, such as about 0.90 atm or less, such as about 0.85 atm or less, such as about 0.80 atm or less, such as about 0.75 atm or less; a time period of about 30 minutes or more, such as from about 1 h to about 24 h, such as from about 2 h to about 10 h, such as from about 3 h to about 6 h, such as about 4 h or about 5 h; and/or under an atmosphere containing about 5 vol % to about 30 vol % O$_2$. In at least one embodiment, the drying conditions include drying the initial foam glass 216 at a temperature of about 150° C., at atmospheric pressure, for about 4 h.

Effective calcination conditions for calcination 220 include heating in, e.g., a chamber furnace, the dried foam glass at a temperature of about 500° C. or more, such as from about 500° C. to about 1,000° C., such as from about 550° C. to about 950° C., such as from about 600° C. to about 900° C., such as from about 650° C. to about 850° C., such as from about 700° C. to about 750° C.; a heating rate of about 1° C./min or more, such as from about 2° C./min to about 5° C./min, such as from about 3° C./min to about 4° C./min; a pressure of about 1.1 atm or less, such as about 1.0 atm or less, such as about 0.95 atm or less, such as about 0.90 atm or less, such as about 0.85 atm or less, such as about 0.80 atm or less, such as about 0.75 atm or less; a time period of at least 5 min, such as from about 5 min to about 2 h, such as from about 0.25 h to about 1.5 h, such as from about 0.5 h to about 1 h; and/or under an atmosphere containing about 5 vol % to about 30 vol % $O_2$. The calcined foam glass is then cooled down at a cooling rate of about 10° C./min or less, such as about 8° C./min or less, such as about 5° C./min or less, such as about 3° C./min or less.

In at least one embodiment, the effective calcining conditions include calcining the dried foam glass at a temperature of about 850° C., at atmospheric pressure, for about 0.5 h with a heating rate of about 3° C./min, and cooling the furnace down to about room temperature at a cooling rate of about 5° C./min.

In some embodiments, the foam glass has one or more of the following characteristics:

(1) A bulk density that is less than about 0.3 g cm$^{-3}$, such as from about 0.1 g cm$^{-3}$ to about 0.25 g cm$^{-3}$, such as from about 0.15 g cm$^{-3}$ to about 0.2 g cm$^{-3}$. The bulk density is obtained from the mass/volume ratio of the foam glass samples.

(2) A thermal conductivity that is less than about 0.2 W m$^{-1}$ K$^{-1}$, such as from about 0.08 W m K$^{-1}$ to about 0.18 W m$^{-1}$ K$^{-1}$ or from about 0.15 W m$^{-1}$ K$^{-1}$ to about 0.2 W m$^{-1}$ K$^{-1}$. The thermal conductivity of the specimen is measured using a heat flow meter-Hot Disk TPS 1500.

(3) A total porosity from about 80% to about 96%, such as from about 85% to about 94%, such as from about 90% to about 92%. The porosity is obtained from the ratio of bulk density and powder density.

The example building materials described herein possess excellent mechanical and physical properties and also have potential economic benefits resulting from the utilization of pyrolysis chars. As a by-product from coal refinery processes, the breakeven price of char is typically far lower than that of competitor materials, leading to a decrease in the cost of building materials. It is estimated that the cost for one ton of CCP, CB, and foam glass is reduced by about 10%, about 18%, about 50%, respectively, relative to competitor materials, while exhibiting similar or superior properties. This cost-effective and sustainable thermo-chemical processing of coal embodying integrated solvent extraction and pyrolysis, for the production of new insulating building materials shows promising potential for building applications. Outputs from this process and the further conversion into products such as CCP, CB, and foam glass, can significantly increase demand for coal, beyond its use in combustion and thermal duties to make energy, power, and fuel. For example, this method may also be functional in the utilization of other resources such as crude oil, natural gas, or biomass, alone or in combination with coal.

Due to the changing material complexity of various coal compositions, each coal composition may behave differently. For example, decomposition or evaporation of volatiles during heating process(es) can lead to significant changes in physical and chemical features of the solid residues formed, e.g., pyrolysis chars.

Examples

The non-limiting examples described herein demonstrate, e.g., the feasibility of a novel and economical approach for fabrication of highly insulating building materials utilizing pyrolysis chars from coal conversion. In some examples, weight ratio compositions of char clay plaster and char bricks that are tuned to improve the porosity and thermal conductivity are identified for purposes of optimizing indoor humidity regulation and energy saving techniques.

Characterization Techniques of Pyrolysis Char Samples

XRD was conducted by a Rigaku Smartlab diffractometer using a Cu Kα radiation source, operated at 40 kV and 40 mA with an angle of reflection, 2θ, varied between 100 and 90°. BET specific surface area of the samples was measured by a Quantachrome Autosorb IQ automated gas sorption analyzer. Organic elemental composition (C, H, N, O, and S) in the liquid tars was characterized by a Vario MACRO Cube Elemental Analyzer (Elementar Analysensysteme GmbH, Germany) to provide ultimate analysis. Proximate analysis results were obtained by a Q600 SDT (TA instruments). The FTIR spectra were recorded on a Nicolet iS50 FTIR spectrometer (Thermo Scientific) using attenuated total reflectance (ATR) technique. FTIR spectra were obtained by collecting 32 scans at a resolution of 4 cm$^{-1}$ in the measuring range of 4000-400 cm$^{-1}$ wavenumbers. Elemental compositions were analyzed by inductively coupled plasma-atomic emission spectroscopy (ICP-AES; Thermo).

Characterization Techniques of Building Materials

Moisture buffering tests followed the ASTM standard—Moisture Buffer Value of Building Materials. The use of climatic exposures varied in 24 h cycles: 24 h of high humidity (75%) followed by 24 h of low humidity (40%). The plaster specimens were sealed with aluminum foils on all exteriors but one surface, to ensure vapor exchange occurred substantially through a single face of the material. Specimens were weighed intermittently during the test. Thermal conductivity was measured using a heat flow meter—Hot Disk TPS 1500. Bulk density of the specimens was calculated by measuring the volume and mass. Compressive strength was determined by loading the specimens under displacement control until failure.

Example 1: Pyrolysis Char Preparation

Because the physical properties and chemical compositions of coal vary widely, thus affecting the conversion process performance and finished properties of manufactured products dramatically, all coal samples were extracted from the Powder River Basin, largely from the Cordero Rojo coal field located in Wyoming.

The coal extraction residue was extracted with tetralin at 360° C. and 250 psi for 3 h and denoted as CER hereafter. The flow rate of the tetralin was 0.1 mL/min for each gram of dried coal. CER samples were converted to pyrolysis char samples by pyrolyzing in a nitrogen containing environment, which in one embodiment is a substantially pure nitrogen environment, at elevated temperatures ranging from about 500° C. to about 900° C. Other solvents such as dimethyl ether (DME) were also deployed and produced pyrolysis chars of similar properties to the CER. Similarly, the type of pyrolysis unit, e.g. a reactor vessel, kiln, direct flame pyrolysis and indirect pyrolysis did not impact the pyrolysis char properties or suitability to make building and construction products.

Example 2: Fabrication of Char Clay Plaster

Example char clay plasters were fabricated by initially mixing clay and water to make a slurry. After 24 h, pyrolysis char, sand, and water were added to the slurry to produce a mousse-like plaster. An appropriate mold was selected to prepare cubic plaster samples. Three different ratios (40 wt %, 50 wt %, 60 wt % to the original weight of sand) of pyrolysis char added into mixtures were utilized for the preparation of example char clay plasters. The weight ratio of clay remained substantially constant (20 wt %). Due to the water absorption of pyrolysis char, more water was utilized for the pyrolysis char-based specimens as compared to the comparative plaster. The weight ratio of water to a total of pyrolysis char and sand is 0.50, 0.56, and 0.62 as the percentage of pyrolysis char is 40 wt %, 50 wt %, 60 wt % to the original weight of sand, respectively. Three different compositional ratios were made for char clay plaster fabrication: the weight ratio of clay, sand, pyrolysis char, and water in these compositions are 1:2.4:1.6:2, 1:2:2:2.24, and 1:1.6:2.4:2.48.

The preparation of the comparative plaster is as follows. Sand, clay and water were added to produce a mousse-like plaster. The initial paste was molded for further curing process at room temperature. The weight ratio of clay, sand, and water is 1:4:1.48.

Example 3: Fabrication of Char Brick

Example char bricks were fabricated by initially combining all dry ingredients together including cement, sand/gravel, and pyrolysis char. The mass ratio of sand replaced by pyrolysis char was set at 30 wt %, 40 wt %, and 50 wt %. Water was then added until the damp mixture obtained a suitable consistency, for example, a consistency suitable for molding into a brick morphology. When 30 wt %, 40 wt %, and 50 wt % of sand in the example char bricks were replaced with pyrolysis char, this value increased to 0.35, 0.45, and 0.55, respectively. The mixture was then loaded into a mold, followed by a curing process in a controlled laboratory environment at room temperature with relative humidity of 75%. Two weeks after leaving the mold, bricks were obtained for further characterization. Three different compositional ratios were made for char brick fabrication: the mass ratio of cement, sand, pyrolysis char, and water in these compositions are 1:2.1:0.9:1.05, 1:1.8:1.2:1.35, and 1:1.5:1.5:1.65.

The comparative brick was made by thoroughly mixing all the dry ingredients together including cement and sand/gravel. Water was then gradually added and the mixture was continuously stirred until the damp mixture reached the right consistency. The mixture was subsequently loaded into an appropriate mold, followed by the curing process in a shady environment. One week after staying in the mold, the brick can be taken out and used for further characterization. The mass ratio of cement, sand and water is 1:3:0.51.

Example 4: Fabrication of Foam Glass

Example foam glass was fabricated from waste glass and coal ash. Sodium carbonate ($Na_2CO_3$) and monosodium phosphate ($NaH_2PO_4$) were chosen as foaming agent and foaming stabilizer, respectively. First, the waste glass was pulverized by a planetary ball mill (through 100 sieve mesh). Subsequently, 0-80 wt % of waste glass powders and 20-40 wt % of coal ash (which may be pulverized), together with 2-5 wt % of $Na_2CO_3$, 2-3 wt % of $NaH_2PO_4$, and 30-60 wt % of water was mixed using mechanical stirring. The foam glass examples, with dimensions of 50 mm×40 mm×20 mm were formed and dried at 150° C. for 4 h in an oven. The specimen was then put into a chamber furnace and a foam glass sample was foamed at 850° C. for 30 min with a heating rate of 3° C./min. Finally, the foam glass was obtained by cooling down the furnace to room temperature at a cooling rate of 5° C./min. All of the heat treatments were conducted under atmospheric pressure of 0.75 atm.

Figures 3A, 3B:
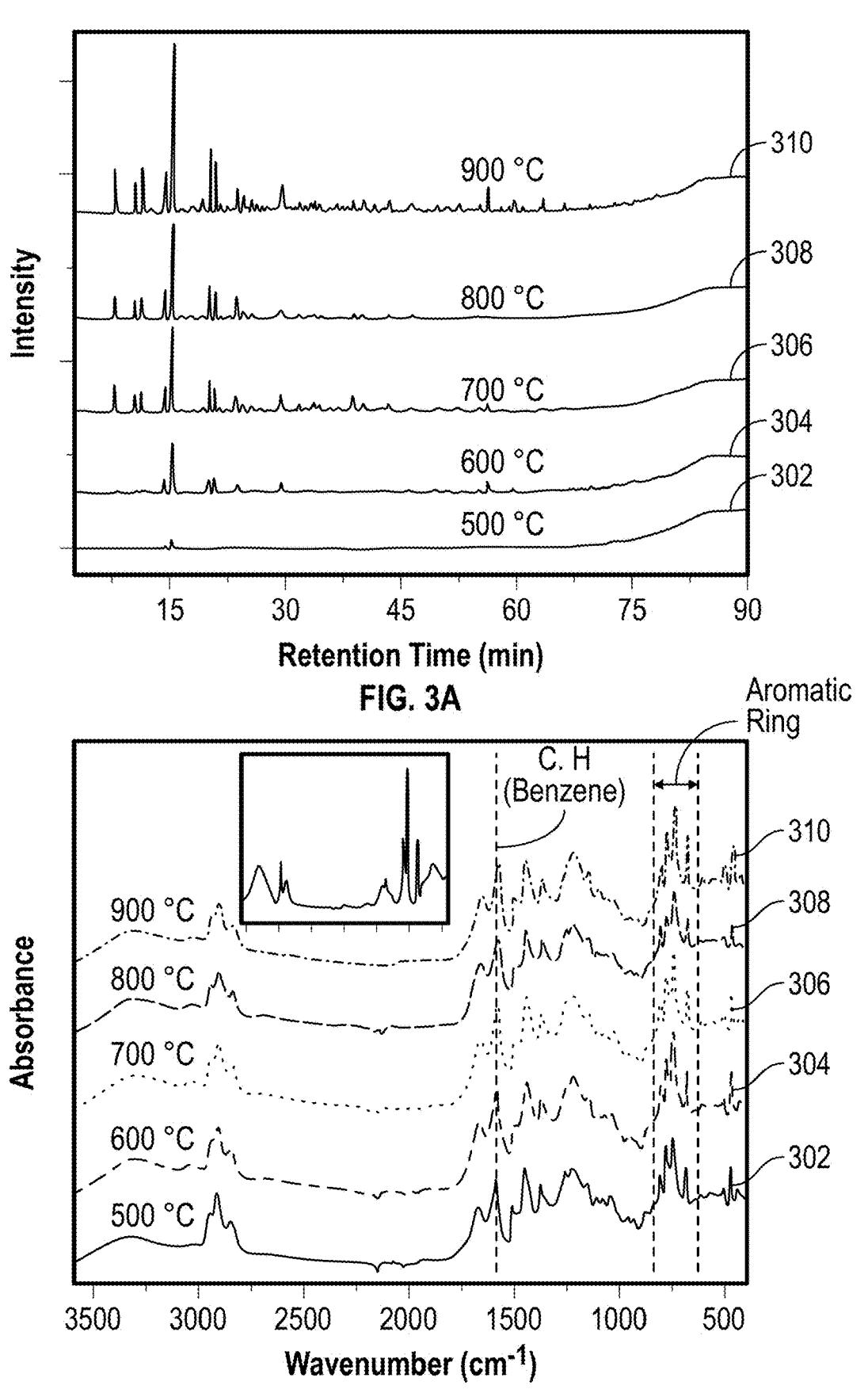
FIG. 3A is a Gas Chromatography-Mass Spectrometry (GC-MS) spectrum of example liquid oils according to at least one embodiment of the present disclosure.
FIG. 3B is a Fourier-Transfer Infrared Spectroscopy (FTIR) spectrum of example liquid oils according to at least one embodiment of the present disclosure. (inset: FTIR spectrum of ethanol).

FIG. 3A shows liquid oil produced from the pyrolysis of CER at various temperatures. The liquid oil was collected with ethanol and analyzed using GC-MS. In FIG. 3A, the liquid oil samples (302, 304, 306, 308, and 310) refer to the liquid oil formed at pyrolysis temperatures of about 500° C., about 600° C., about 700° C., about 800° C., and about 900° C., respectively. As shown in FIG. 3A, the composition of the liquid oil 110 becomes more complex as the pyrolysis temperature increases from about 500° C. to about 900° C. This is likely because highly volatile compounds are decomposed from CER samples at higher temperatures. The major peaks of the GC-MS were identified by mass spectrum (National Institute of Standards and Technology (NIST) library) and assigned to the organic compounds as shown in Table 1.

TABLE 1

| Major Compounds in Liquid Oil 110 | |
|---|---|
| Retention time (min.) | Compound |
| 7.7 | Phenol |
| 10.2 | 1,2-Cyclooctadiene |
| 14.2 | Naphthalene, 1,2,3,4-tetrahydro- |
| 15.1 | Naphthalene |
| 19.8 | Benzocycloheptatriene |
| 20.5 | Naphthalene, 1-methyl- |
| 23.2 | Coumarin |
| 29.0 | 1-Naphthalenol |
| 55.9 | 9H-Fluorene, 9-(phenylmethylene)- |

The liquid oil 110 predominantly contains aromatics such as naphthalene and phenolic species, as well as other hydrocarbons, some of which are not aromatic, recognizing that light aliphatic components are extracted during solvent extraction 103 prior to the pyrolysis 108. The bond vibrations assigned to aromatics in the various liquid oil samples can also be observed with qualitative FTIR analysis as shown in FIG. 3B. The spectral differences between each sample is not obvious, indicative of similar (or same) dominant compositions in liquid oils. The peaks at about 3300 cm$^{-1}$ and 2910 cm$^{-1}$ attributed to stretching —OH bond and stretching aliphatic C—H bond are likely due to the existence of small amounts of alcohol solvent (e.g., ethanol) that is used for collecting the liquid oil that was not removed completely. The organic matter in the liquid oil 110 suggests that the liquid oil 110 could be utilized as an alternative fuel as a substitution of conventional energy sources and/or as a feedstock for chemical production or manufacture of other engineered products such as, e.g., asphalt paving, asphalt roofing, carbon fiber, polymeric resins, and coatings. Subsequent separation and processing of the liquid oil can be performed, such as polymerization with other reactants such as amines, hydrogen donating solvents, polar, and aromatic solvents and ionic liquids, at pressures ranging from about atmospheric pressure up to about 200 bar, and temperatures ranging from about room temperature up to about 900° C. Such example products made from the liquid oil 110 can be used to prepare other carbonaceous materials.

Figure 2B:
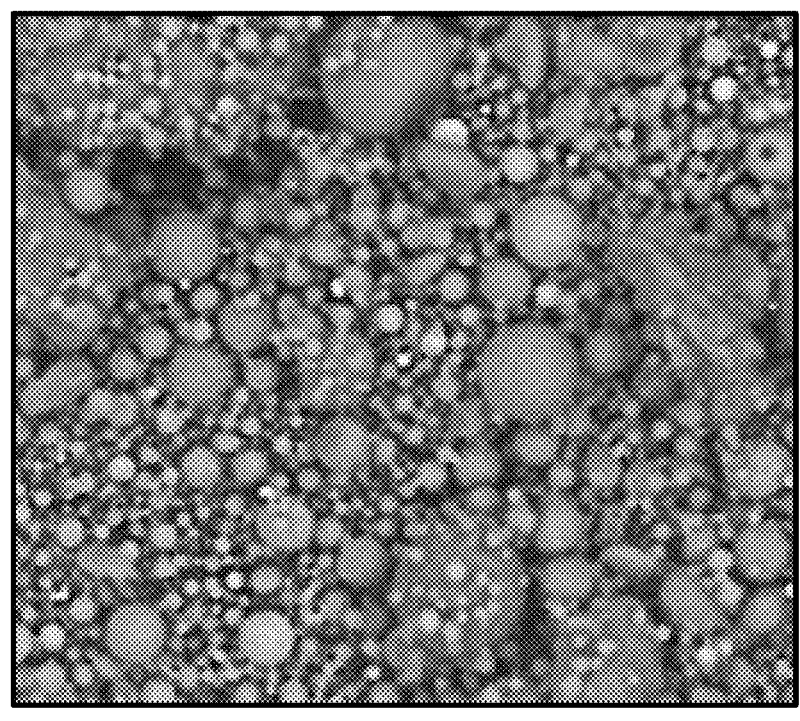
FIG. 2B illustrates a Scanning Electronic Microscope (SEM) image of example coal ash according to at least one embodiment of the present disclosure.
Figure 2C:
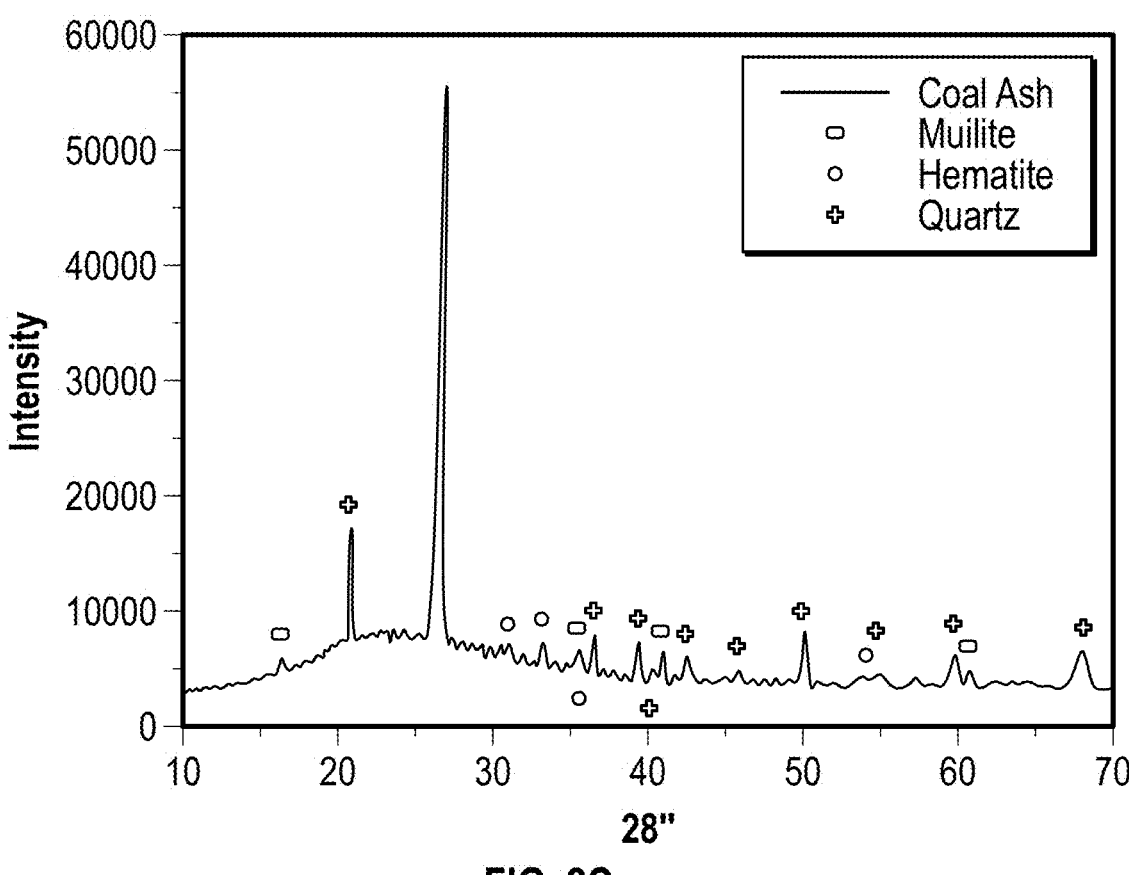
FIG. 2C is a graph illustrating the X-ray Diffraction (XRD) pattern of example coal ash according to at least one embodiment of the present disclosure.

FIG. 2B and FIG. 2C illustrate an SEM image and a typical XRD pattern of the coal ash, respectively, and suggests that coal ash mainly contains four phases: vitreous beads, ferrite, mullite, and amorphous carbon, within which the mullite and ferrite are crystals while the beads and carbon are amorphous. There are many spherical and smooth vitreous beads, with different diameters, formed during rapid cooling which make up a majority of the composition within the coal ash. The peaks corresponding to mullite and quartz are present via the XRD patterns; therefore, it is believed that the alumina silicate can be assigned to mullite phase and the crystalline mullite and quartz are thermally stable.

Figure 2D:
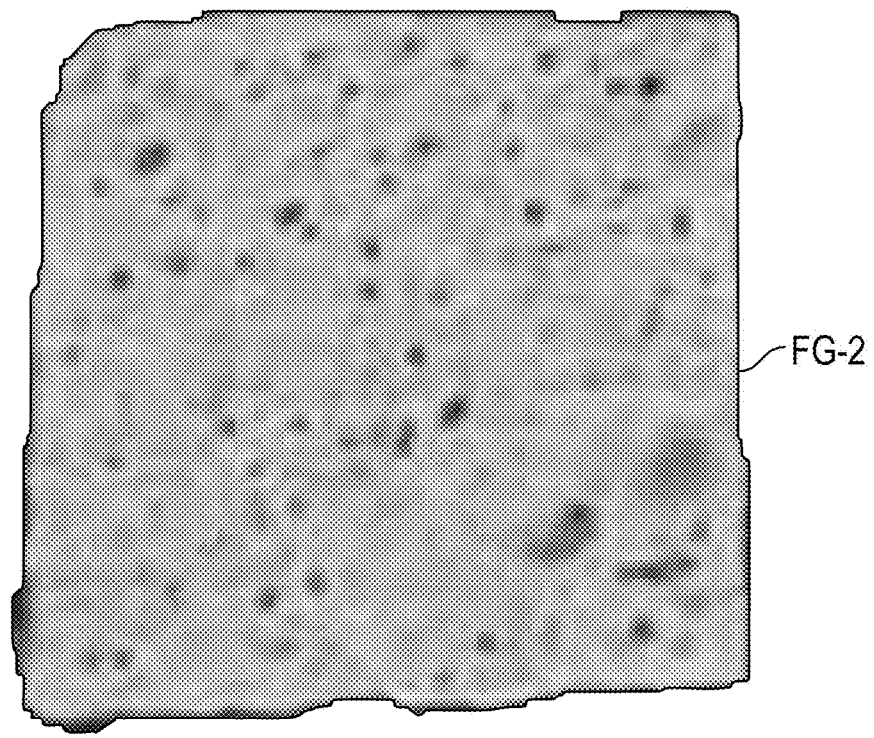
FIG. 2D illustrates optical photos of the example foam glass with differing ratios of foaming agent, specifically 2 wt % $Na_2CO_3$ and 4 wt % $Na_2CO_3$, according to at least one embodiment of the present disclosure.
Figure 2D:
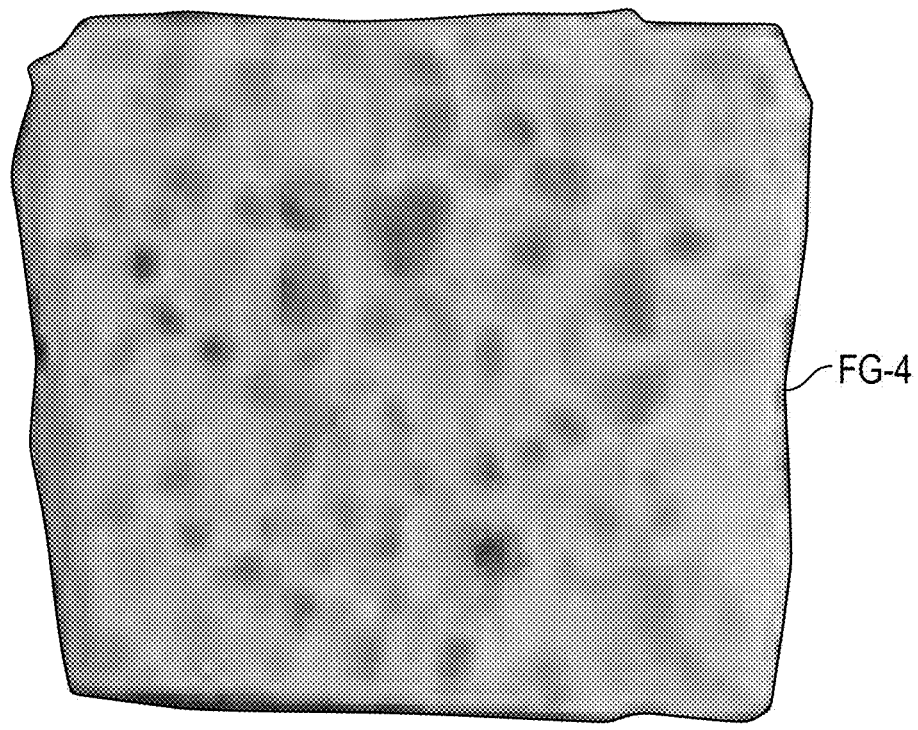

Foam glasses with different ratios of foaming agent (about 2% and about 4%) are prepared, as described above, and are labeled as FG-2 and FG-4, respectively, as shown with the optical photos in FIG. 2D. The bulk density of the sample decreases (from about 0.189 g cm$^{-3}$ to about 0.162 g cm$^{-3}$) with the increasing of foaming agent content from 2% to 4%, but the foam glass's pore structure tends to be more non-uniform, and the strength of FA-4 is significantly reduced. The thermal insulation performance of the sample was tested by a Hot Disk-1500 thermal constant analyzer. The thermal conductivity of FA-2 and FA-4 are about 0.108 W m$^{-1}$ K$^{-1}$ and about 0.142 W m$^{-1}$ K$^{-1}$, respectively. The total porosity of FA-2 and FA-4, calculated from the ratio of bulk density and powder density, is about 92.50% and about 93.60%, respectively.

Figure 4A:
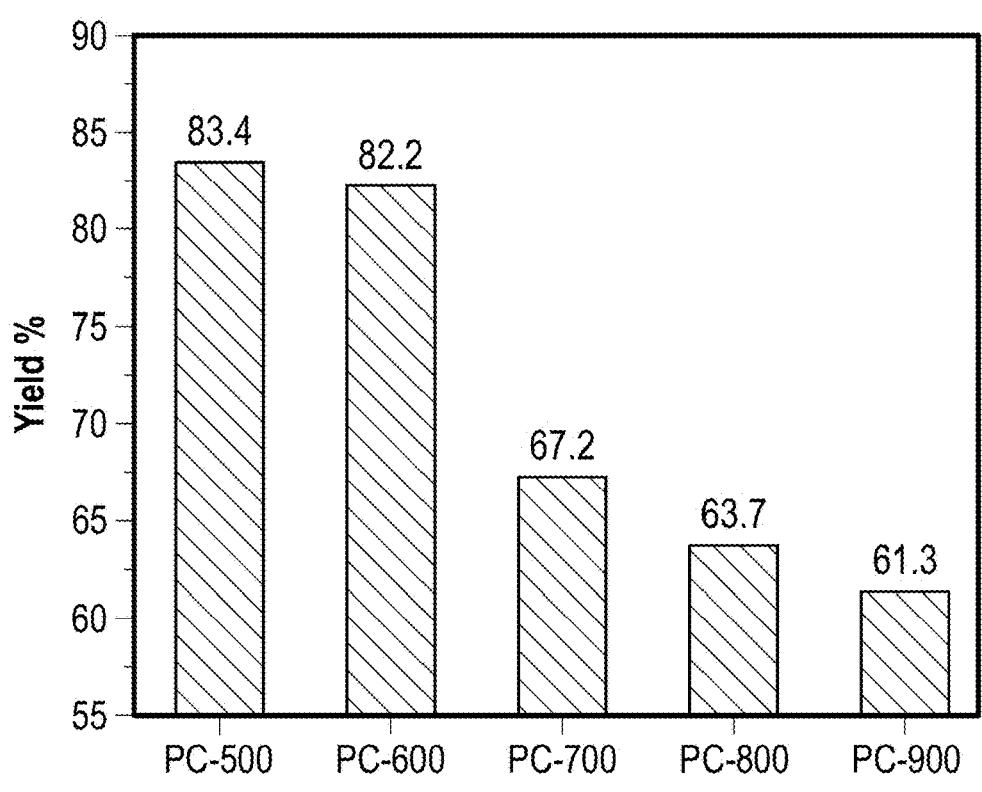
FIG. 4A is a bar graph illustrating yields of example pyrolysis chars from different pyrolysis temperatures according to at least one embodiment of the present disclosure.
Figure 4B:
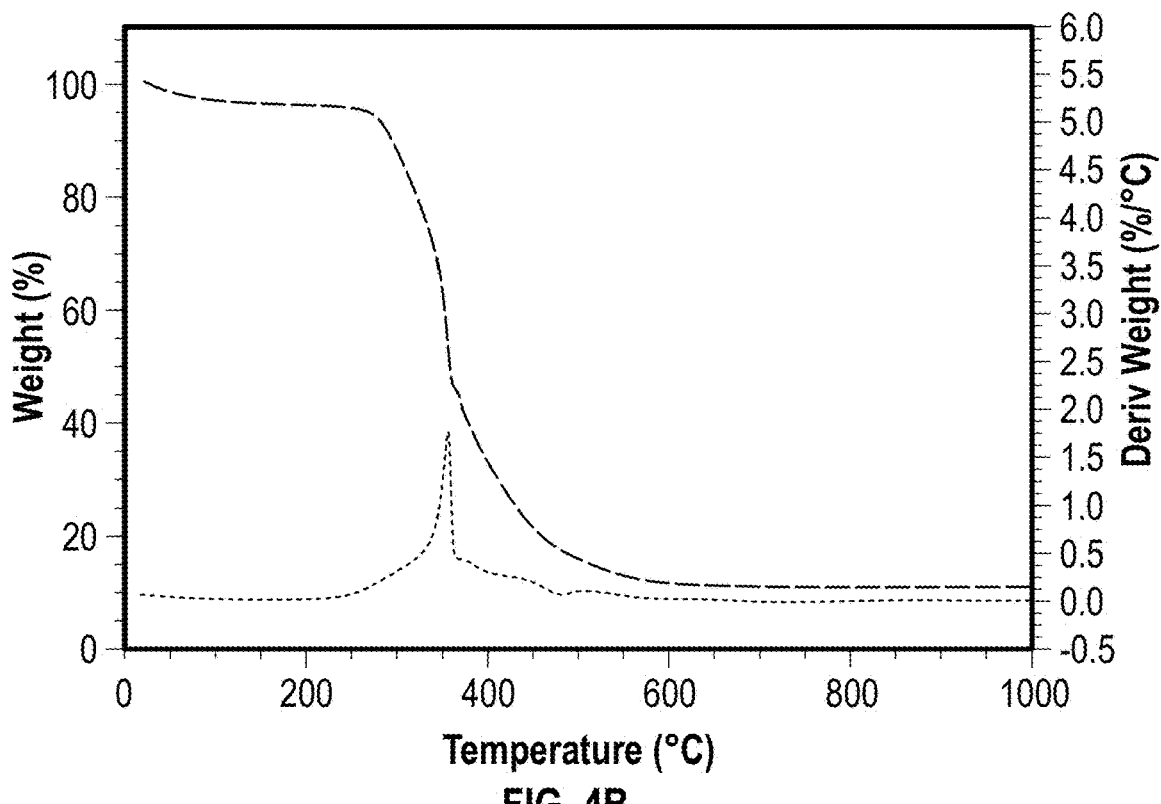
FIG. 4B is a thermogravimetric analysis of an example coal extraction residue illustrating changes in structural features during thermochemical processing according to at least one embodiment of the present disclosure.

As shown in FIG. 4B, the pyrolysis char is calcined, under effective calcination conditions, in air to generate about 10.90 wt % of coal ash based on the total weight of pyrolysis char, which is utilized for the fabrication of insulating foam glass owing to the high percentage of silica and alumina contents in coal ash. The long-dashed curve indicates the weight change of the example coal extraction residue as a function of the temperature rising, and the short-dashed curve indicates the derivative weight change of an example coal extraction residue as a function of the temperature rising. Effective calcination conditions include a temperature from about 600° C. to about 1200° C., such as from about 700° C. to about 1100° C., such as from about 800° C. to about 1000° C., such as from about 900° C. to about 950° C.

The chemical compositions of coal ash 116 shown in Table 2 indicates that the coal ash 116 contains about 24.02 wt % silica, about 26.18 wt % alumina, and other oxides, such as Fe$_2$O$_3$, CaO, MgO, etc. Although the concentration of various rare earth elements were not determined, coal/coal ash is an important alternative resource of rare earth elements due to the high concentrations of rare earth elements in coal/coal ash. Recent developments continue to include the detection and recovery of rare earth elements in high efficiency from coal ashes.

of building materials. It is estimated that the cost for one ton of CCP, CB, and foam glass is reduced by about 10%, about 18%, about 50%, respectively, relative to competitor materials. This cost-effective and sustainable approach for fabricating new insulating building materials advantageous for various building applications. These outputs—CCP, CB, and foam glass—can significantly increase demand for coal, beyond its use in combustion and thermal duties to make energy, power, and fuel. For example, this method may also be functional in the utilization of other resources such as crude oil, natural gas, or biomass alone, or in combination with coal.

FIG. 4A is a bar graph illustrating yields of example pyrolysis chars from the pyrolysis of coal extraction residue according to at least one embodiment of the present disclosure. In FIG. 4A, the example pyrolysis chars is named along with its corresponding pyrolysis temperature. For example, PC-500 is the example pyrolysis char resulting from pyrolysis of the coal extraction residue at about 500° C. As shown, the solid residue yield decreases from about 83.4% to about 61.3% as the pyrolysis temperature increases from about 500° C. to about 900° C. Owing to, e.g., the removal of low volatile organic compounds by solvent extraction, PC-500 and PC-600 have a reasonably high yields of about 83.4% and about 82.2%, respectively, supporting the hypothesis that the chemical property of these samples may be close to that of the coal extraction residue subjected to pyrolysis. A significant decrease in yield was observed when the pyrolysis temperature was increased to about 700° C., which is likely a result of the decomposition of various organic compounds during pyrolysis. In addition, yields of about 63.7% and about 61.3% are achieved from the pyrolysis of coal extraction residue at about 800° C. and about 900° C., respectively. Improved pyrolysis yields, as provided by embodiments described herein, advantageously reduce the economic cost of the formed building materials relative to conventional building materials.

FIG. 4B is a thermogravimetric (TG) analysis of an example coal extraction residue. The TG analysis reveals changes in structural features of the coal extraction residue during the heating process and also reveals the decomposition process of organic compounds during pyrolysis. At a temperature of about 360° C., a significant decrease in the weight percent of the coal extraction residue was observed. Such a decrease in weight percent likely indicates that a large quantity of organic compounds decomposed, evaporated, volatilized, or otherwise liberated at this temperature.

TABLE 2

| Analysis of Ash Compositions in CER Samples by ICP-AES | | | | | | | | |
|---|---|---|---|---|---|---|---|---|
| Compound | Al$_2$O$_3$ | CaO | Fe$_2$O$_3$ | K$_2$O | MgO | Na$_2$O | SiO$_2$ | Others |
| Coal ash (wt %) | 26.18 | 25.47 | 8.18 | 1.08 | 5.42 | 4.85 | 24.02 | 4.80 |

The example building materials described herein possess excellent mechanical and physical properties and also have potential economic benefits resulting from the utilization of pyrolysis chars. As a by-product from coal refinery processes, the breakeven price of char is typically far lower than that of competitor materials, leading to a decrease in the cost Ultimate analysis and proximate analysis of an example coal extraction residue and example pyrolysis chars are shown in Table 3. The ultimate analysis identifies the elemental composition and the ratio of each element in the coal extraction residue and the pyrolysis chars. The proximal analysis identifies the moisture content, ash content, and volatile content in the pyrolysis chars.

TABLE 3

Ultimate and Proximate Analysis of Coal Extraction
Residue and Pyrolysis Char Samples

| | Ultimate analysis (wt/wt %) | | | | | Proximate analysis (wt/wt %) | | |
|---|---|---|---|---|---|---|---|---|
| | N | C | O | H | S | Moisture | Ash | Volatile |
| CER | 1.07 | 67.06 | 26.39 | 4.70 | 0.78 | 4.06 | 10.90 | 38.7 |
| PC-500 | 1.07 | 67.31 | 26.87 | 4.00 | 0.75 | 3.40 | 13.30 | 22.1 |
| PC-600 | 1.11 | 69.55 | 24.53 | 4.00 | 0.81 | 3.26 | 12.07 | 20.9 |
| PC-700 | 1.13 | 80.63 | 14.98 | 2.50 | 0.76 | 3.41 | 16.39 | 5.9 |
| PC-800 | 1.05 | 81.31 | 14.77 | 2.07 | 0.80 | 2.77 | 15.93 | 2.4 |
| PC-900 | 1.03 | 82.69 | 14.42 | 2.08 | 0.78 | 3.17 | 15.98 | 0 |

Table 3 illustrates the results of ultimate analysis and proximate analysis of an example coal extraction residue and example pyrolysis chars pyrolyzed at different temperatures. The CER had the lowest carbon content, highest oxygen content, and highest hydrogen contents, indicating ample oxygenated functional groups. With increases in the pyrolysis temperature, the carbon content rose from about 67.31% to about 82.69%, along with the reduction in oxygen content and hydrogen content, which is due to the evaporation/decomposition of the volatile organic compounds. This can also be observed from the proximate data, showing the volatile contents decrease from about 22.1% (PC-500) to about 0% (PC-900). The data supports that the pyrolysis chars pyrolyzed at temperatures of about 700° C. or more have the least amount of volatiles such as oxygenated organic groups and possess the stable aromatic carbon form, which can be desirable for building and construction materials.

Figure 5A:
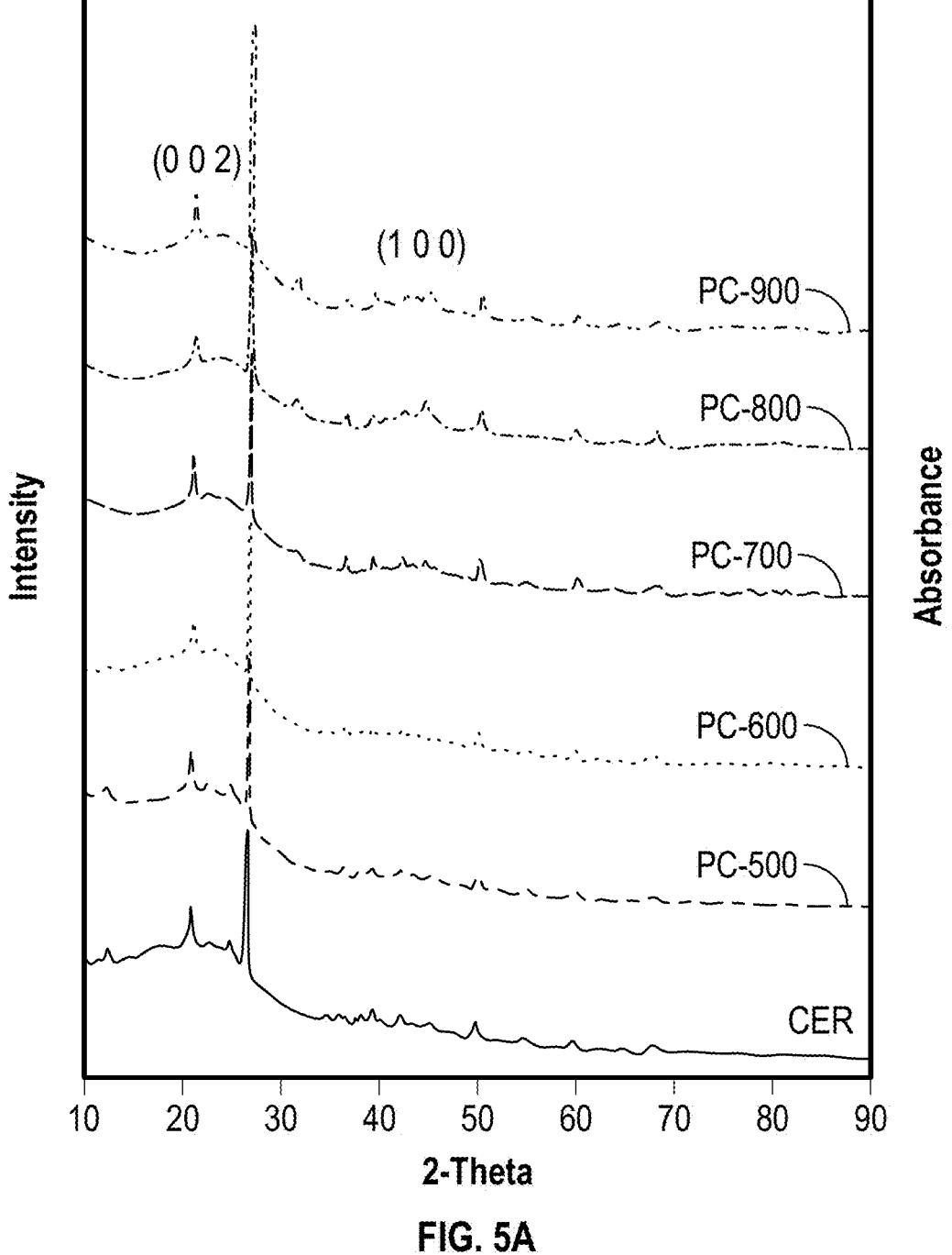
FIG. 5A illustrates an XRD pattern of an example coal extraction residue and example pyrolysis chars formed from the pyrolysis of the example coal extraction residue according to at least one embodiment of the present disclosure.

FIG. 5A is an XRD pattern of an example coal extraction residue and example pyrolysis chars formed from the pyrolysis of the coal extraction residue according to at least one embodiment of the present disclosure. An intense broad peak corresponding to the (0 0 2) graphite basal plane reflection can be observed at 2θ values from about 200 and about 30°. A weak broad peak, attributed to (1 0 0) graphite crystal faces reflection, can be observed at a 2θ value of about 430 and demonstrates the graphite crystalline feature of the sample. The intensity of the peak at about 430 increases with increasing pyrolysis temperature, indicating that the carbon species in the sample is in a stable aromatic form. Additionally, there are many sharp diffraction peaks due to the minerals of the sample. As the pyrolysis temperature is increased, there is an increased ratio of oxides which results in more intense peaks. Due to the relatively low percentage (about 10% to about 15%) of inorganic minerals in the 2θ and pyrolysis chars, the assigned peak is not dominant in XRD patterns except for two sharp and intensive peaks at 2θ values of about 21° and about 26° attributable to silica.

Figure 5B:
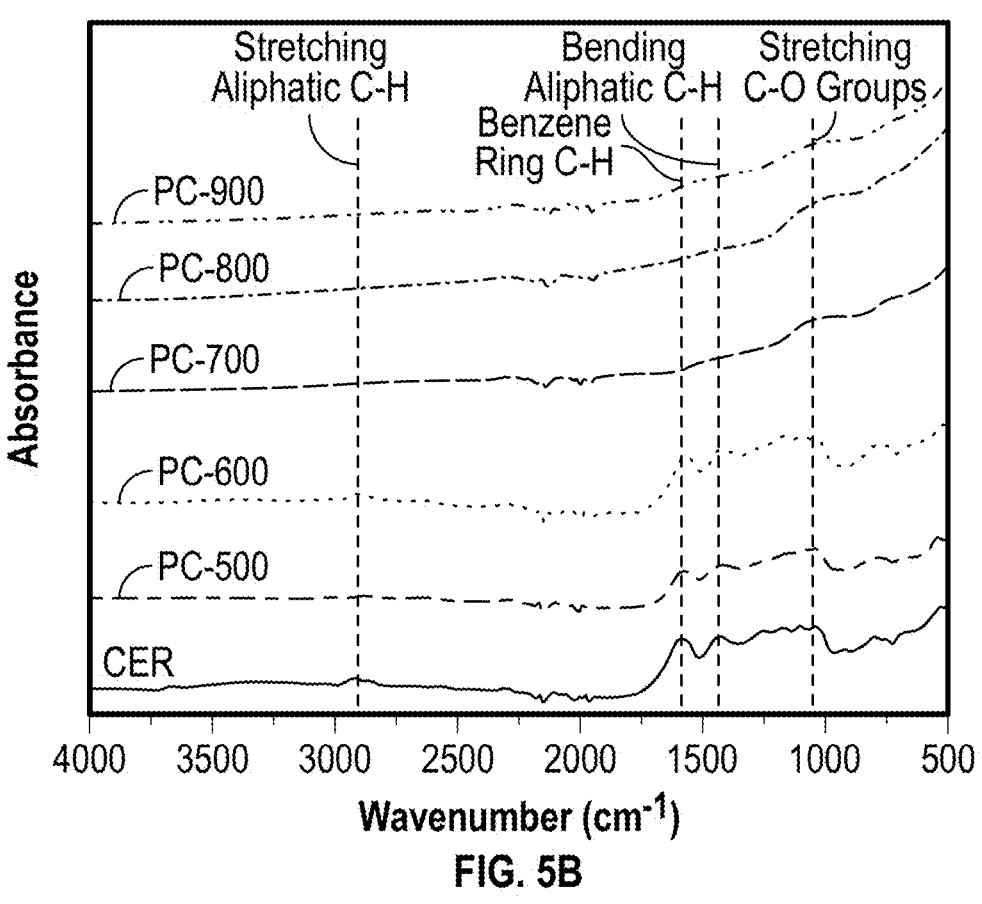
FIG. 5B illustrates an FTIR spectra of an example coal extraction residue and example pyrolysis chars formed from the pyrolysis of the example coal extraction residue according to at least one embodiment of the present disclosure.

FIG. 5B is an FTIR spectra of an example coal extraction residue and example pyrolysis chars formed by the pyrolysis of the coal extraction residue according to at least one embodiment of the present disclosure. The FTIR spectra provides characteristics of the surface of the example pyrolysis chars with major peaks corresponding to various functional groups of surface compounds. When raising the pyrolysis temperature from about 500° C. to about 900° C., many vibrational bonds disappear and the intensity of the absorbance bands decreases, supporting the decomposition and/or evaporation of various organic compounds during pyrolysis. This result is further supported by the XRD results described above.

The weak and broad absorption band at about 3300 cm$^{-1}$ corresponds to the hydroxyl groups in the organic components which mainly include phenolic —OH or alkyl hydroxyls. The aliphatic —CH stretching is attributed to a wavenumber of about 2910 cm$^{-1}$, while the wavenumber of about 1430 cm$^{-1}$ corresponds to aliphatic —CH bending. The spectra of PC-500 and PC-600 is close to that of the coal extraction residue (CER), suggesting that the functional groups in each of these samples do not significantly change after pyrolysis. As the pyrolysis temperature increases from about 700° C. to about 900° C., however, the assigned peaks begin to weaken or disappear implying that various organic compounds in PC-700, PC-800, and PC-900 are predominantly decomposed and the carbon has changed to be more graphite-like, whereas CER, PC-500, and PC-600 have ample oxygenated functional groups on their surfaces.

Figure 6:
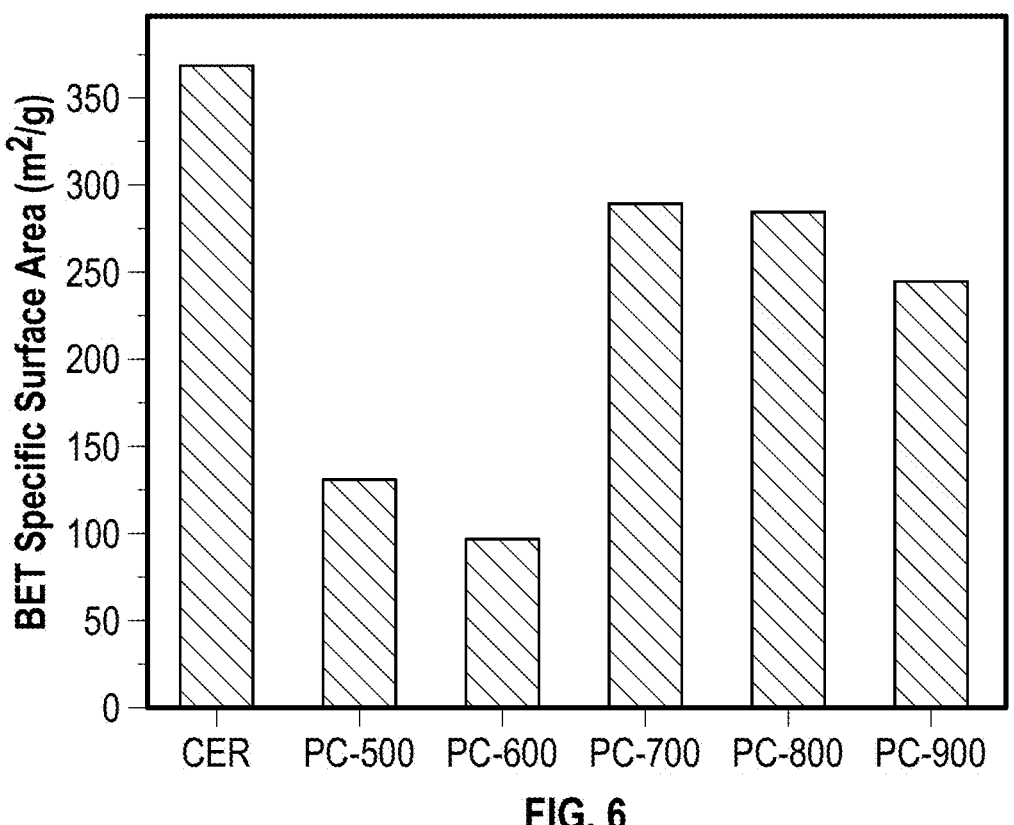
FIG. 6 is a bar graph illustrating the Brunauer-Emmett-Teller (BET) specific surface area of an example coal extraction residue and its example pyrolysis chars according to at least one embodiment of the present disclosure.

FIG. 6 shows BET specific surface areas of the example coal extraction residue and example pyrolysis chars formed by the pyrolysis of coal extraction residue according to at least one embodiment of the present disclosure. The example CER possesses a high BET surface area with a value of about 370 m$^2$ g$^{-1}$. The CER benefits from the extraction of low volatile organic matter from coal which leads to the cavity in the sample. The decreased BET specific surface area for PC-500 (about 125 m$^2$ g$^{-1}$) and PC-600 (about 100 m$^2$ g$^{-1}$) are a result of, e.g., melted organic compounds at about 500° C. which do not decompose until exposure to a pyrolysis temperature of about 700° C. The remaining organic compounds therefore results in partial pore blockage at about 500° C. to about 600° C. The yield of the pyrolysis char (in FIG. 4A) also indicates that there is a weight loss of about 18% when pyrolysis occurs at temperatures below about 600° C. As the temperature increases above about 700° C., the pores reappear and result in a larger specific surface area for PC-700 (about 290 m$^2$ g$^{-1}$), PC-800 (about 285 m$^2$ g$^{-1}$), and PC-900 (about 245 m$^2$ g$^{-1}$). However, the BET specific surface area values for PC-700, PC-800, and PC-900 is still lower than that of the CER, which is likely attributable to residual carbon inside the pores that originated from the decomposition of melted organic species above about 700° C. On the other hand, the collapse and/or shrinkage of the carbon structures under high temperatures may also lead to lower BET specific surface area values. The BET specific surface area of the pyrolysis char samples, has certain benefits, such as porosity to provide high surface area to volume ratios, which can be deployed to improve, e.g., thermal conductivity, abate noise, and reduce weight. Further these pyrolysis chars have a high degree of purity, e.g., containing little or no heavy metals or impurities such as sulfur compounds.

Although the example CER possesses a higher degree of porosity than the corresponding example pyrolysis chars, numerous types of organic functional groups remain in the CER, as discussed above, as well as in PC-500 and PC-600. However, due to the ample oxygenated function groups and volatiles in those samples, this may result in instability and an efflorescence effect when exposed to air and a moist environment if these samples are utilized for the fabrication of building materials. There is a relationship in pyrolysis char stability as a function of the molar ratio of oxygen to carbon (O:C) in the resulting pyrolysis chars whereby lower O:C molar ratios result in a longer predicted pyrolysis char half-life due to the lower percentage of oxygenated groups of the pyrolysis chars. The O:C molar ratio can be calculated from the ultimate analysis results shown in Table 3. PC-700, PC-800, and PC-900, having an O:C molar ratio of less than about 0.2, are stable and have half-lives of more than about 1000 years; whereas PC-500 and PC-600, having an O:C molar ratio from about 0.2 to about 0.6, possess half-lives of about 100 to about 1000 years. With the calculations from Table 3, the O:C molar ratio of the resulting pyrolysis chars, in order of increasing pyrolysis temperature, is about 0.30, about 0.26, about 0.14, about 0.14, and about 0.13. Accordingly, the results in Table 3 indicate, e.g., that higher-temperature pyrolysis chars are more stable than lower-temperature pyrolysis chars. Additionally, the volatile organic compounds in the lower-temperature pyrolysis chars may be released continuously over time. Thus, the pyrolysis chars prepared at higher pyrolysis temperatures, e.g., between about 700° C. and about 900° C., are believed to be applicable as a starting material, for example, char clay plaster and char brick, due to, e.g., its long-term durability. The pyrolysis chars formed from the pyrolysis of coal extraction residue at temperatures between about 700° C. and about 900° C., are utilized as non-limiting starting materials in the fabrication of example char clay plasters, example char bricks, and example foam glass to demonstrate superior performance. However, other pyrolysis chars can be used to fabricate char clay plaster, char bricks, and foam glass.

Figure 7:
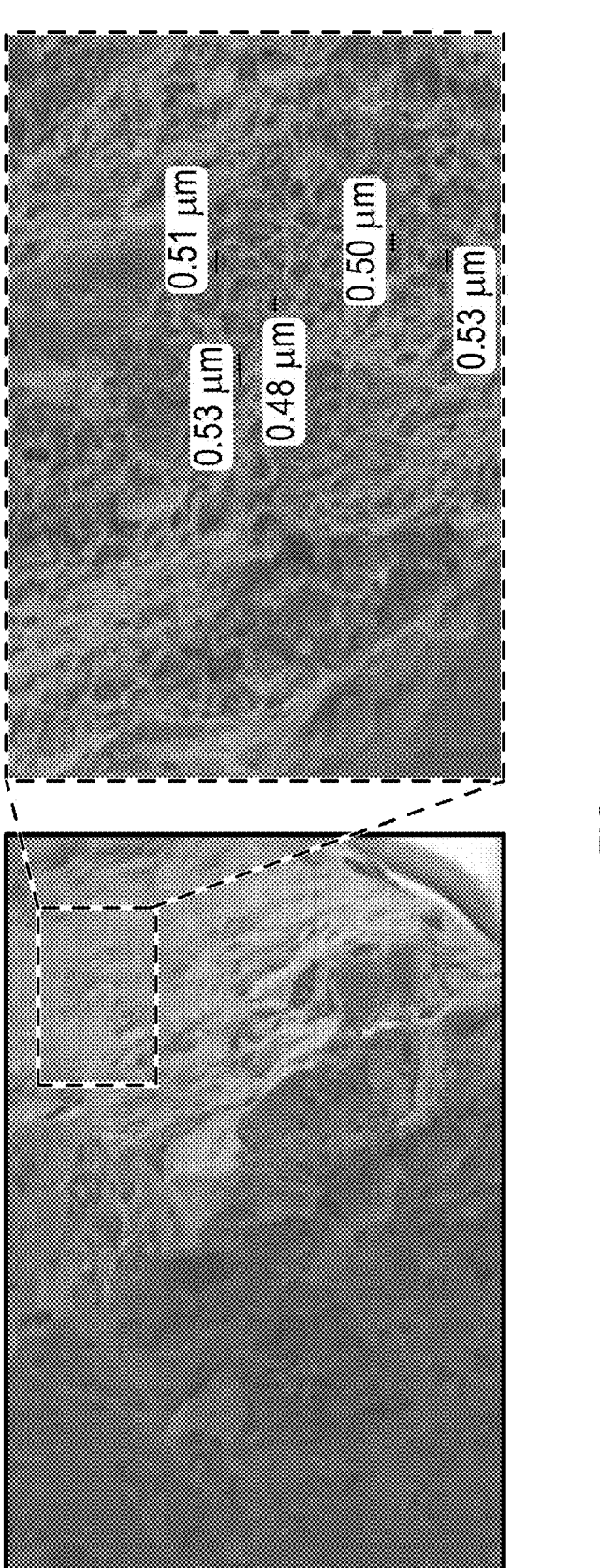
FIG. 7 illustrates the SEM microscopic images of Pyrolysis Char-700 (PC-700) according to at least one embodiment of the present disclosure.

FIG. 7 shows SEM microscopic images of an example pyrolysis char (PC-700). The SEM images clearly show the porous features of the pyrolysis char. The pore sizes are not homogeneously uniform, having an average macropore diameter of about 0.51 μm. The porous structure results in, e.g., a low bulk density and a reduced thermal conductivity of the building material made from the pyrolysis chars. Because the air contained inside the pores has a lower thermal conductivity compared to other compositions such as solid pore walls, heat transfer between both sides of the building is hindered. Moreover, the large specific surface and high porosity characteristics of the pyrolysis char are believed to enable water to be absorbed and stored in these pores, resulting in improved regulation of indoor humidity.

For the char clay plaster (CCP) examples and char brick (CB) examples fabricated following the procedures described herein, the subscripts in the designations $CCP_{x,y}$ and $CB_{x,y}$ indicate the weight ratio of sand replaced by pyrolysis char (x) and the temperature at which the pyrolysis char was formed (y), respectively.

Figures 8A, 8B:
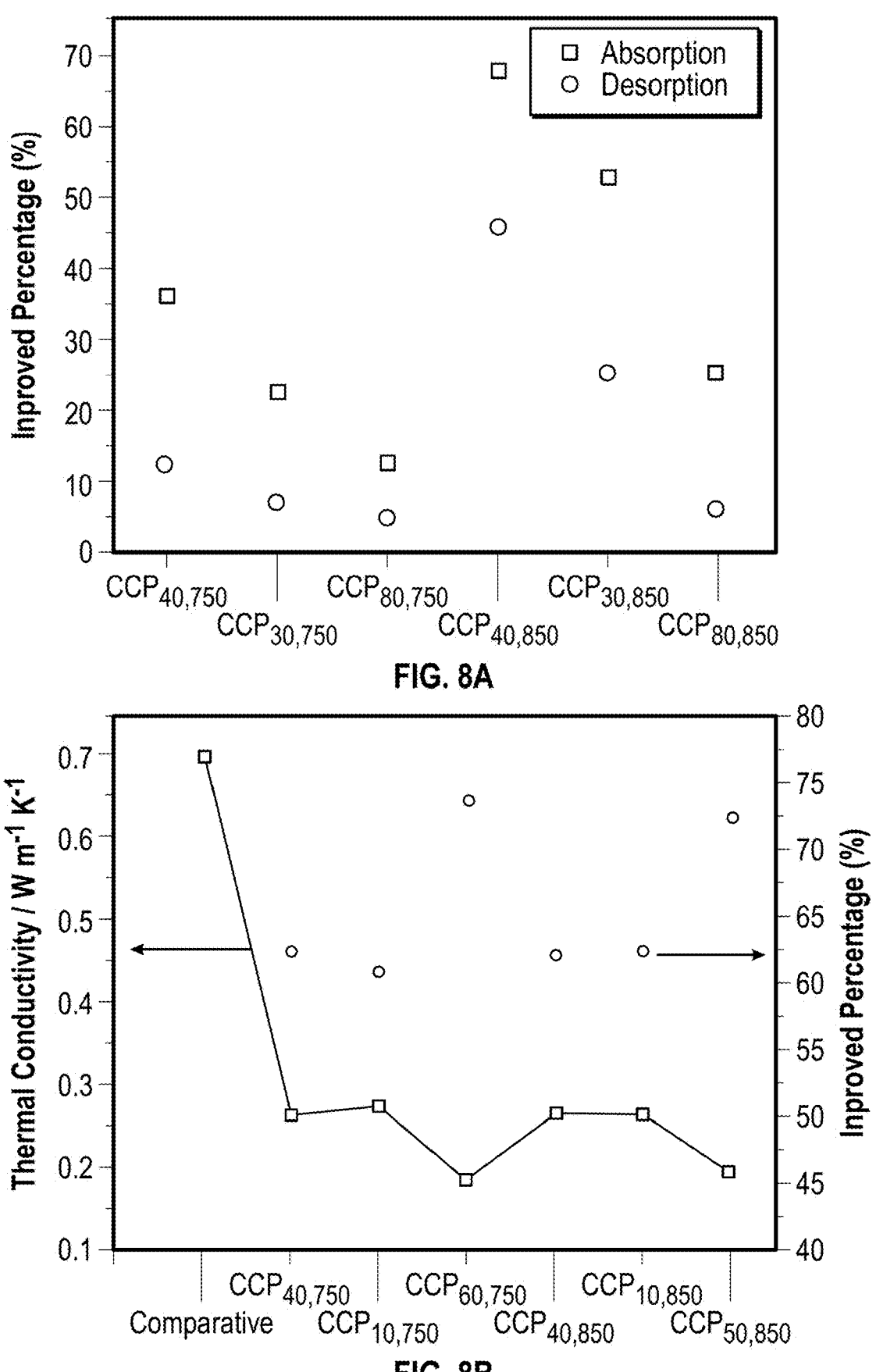
FIG. 8A is a graph illustrating the enhanced water capacity of example char clay plasters from four water absorption-desorption cycles compared to that of comparative plaster according to at least one embodiment of the present disclosure.
FIG. 8B is a graph illustrating the thermal conductivity performance of example char clay plasters compared to a comparative plaster according to at least one embodiment of the present disclosure.

FIG. 8A is a graph illustrating the enhanced water capacity of example char clay plasters from four water absorption-desorption cycles compared to that of comparative plaster according to at least one embodiment of the present disclosure. Desorption capability is defined as the ratio of the water removed from the specimen in the desorption cycle to the weight of the specimen. All of the example char clay plasters show an improved percentage of water absorption and desorption capacity of char clay plasters, and the amount of absorbed/desorbed water increases when the pyrolysis char is introduced because of, e.g., the porosity of the pyrolysis char.

Among the example char clay plasters, $CCP_{40,850}$ possesses the highest water capacity. The water absorption and desorption capability of the example $CCP_{40,850}$ specimen increases by about 68% and about 46%, respectively, relative to the comparative plaster. Moreover, the example char clay plasters derived from pyrolysis char formed at a temperature of about 850° C. have better water absorption performance and desorption performance compared to those derived from the pyrolysis char formed at a temperature of about 750° C. An increased porosity and a larger BET specific surface area of the higher-temperature pyrolysis char is a likely cause of this result. The large specific surface area and high porosity characteristics enable water to be absorbed and stored in the pores and thus improve regulation of indoor humidity. Table 4 shows that the example char clay plasters derived from pyrolysis chars formed at about 850° C. have a larger BET specific area than that of char clay plasters derived from pyrolysis chars formed at about 750° C. Additionally, the BET specific surface area of the comparative plaster is about 34 m² g⁻¹; whereas, the example char clay plasters have a much larger specific surface area. These results suggest that pyrolysis char-derived plaster exhibits improved insulation properties and moisture-buffering properties. In addition, the bulk density of the example char clay plasters is much lower than the comparative plaster (about 50% lower or more), generating less structural loads.

TABLE 4

Example Properties of Char Clay Plasters

| Specimen | BET Specific Surface Area, $m^2 g^{-1}$ | Bulk Density*, $g\ cm^{-1}$ | Thermal Conductivity, $W\ m^{-1}\ K^{-1}$ |
|---|---|---|---|
| Comparative Plaster | 34 | 1.93 | 0.6993 |
| $CCP_{40,\ 750}$ | 45 | 0.96 | 0.2632 |
| $CCP_{50,\ 750}$ | 142 | 0.95 | 0.2743 |
| $CCP_{60,\ 750}$ | 185 | 0.57 | 0.1839 |
| $CCP_{40,\ 850}$ | 242 | 1.04 | 0.2653 |
| $CCP_{50,\ 850}$ | 276 | 1.05 | 0.2630 |
| $CCP_{60,\ 850}$ | 337 | 0.58 | 0.1933 |

*Bulk density is calculated from the mass/volume ratio of the specimen.

Figure 9A:
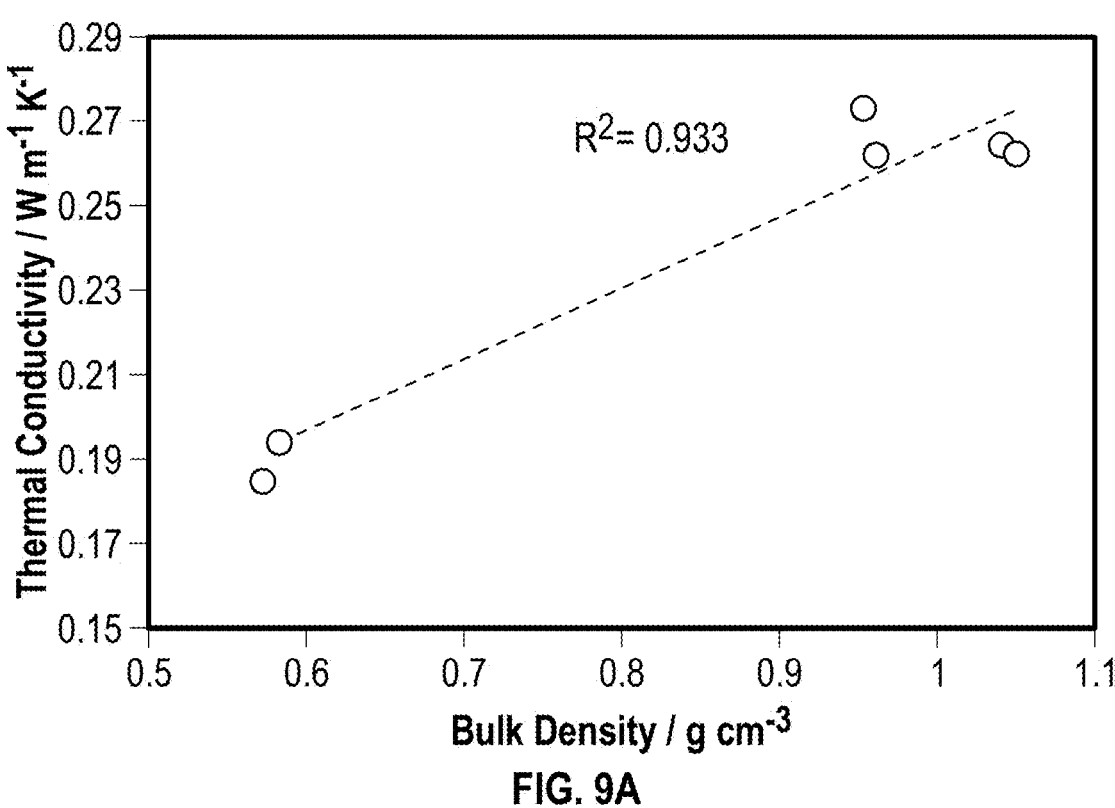
FIG. 9A is a graph illustrating the relationship between thermal conductivity and bulk density of example char clay plasters according to at least one embodiment of the present disclosure.

FIG. 8B summarizes the thermal conductivities of example char clay plasters relative to a comparative plaster. The data demonstrates the improved insulation properties of the example char clay plasters as a building material relative to the comparative plaster. Relative to the comparative plaster made of sand which possesses a thermal conductivity of about 0.6993 W m⁻¹ K⁻¹, the example char clay plasters exhibit enhanced insulation characteristics with reduced thermal conductivity due to, e.g., the porosity and bulk density of the pyrolysis char. The air contained inside the example char clay plasters' pores have a lower thermal conductivity compared to other compositions, thus hindering the heat transfer between both sides (indoor and outdoor) of building materials fabricated from such materials. Depending on the preparation temperature and mass ratio of pyrolysis chars to sands, the example char clay plasters have a much lower thermal conductivity value in comparison to the comparative plaster. For example, the lower thermal conductivity exhibited by $CCP_{50,850}$ provides for enhanced thermal insulation with an increase of up to about 73.70%. In addition, the example char clay plasters with high contents of pyrolysis char perform better and exhibit the lowest thermal conductivity of about 0.1839 W m⁻¹ K⁻¹ and 0.1933 W m⁻¹ K⁻¹ for $CCP_{60,750}$ and $CCP_{60,850}$, respectively. As shown in FIG. 9A, a relatively strong relationship ($R^2$=0.933) can be seen between thermal conductivity and bulk density in the example char clay plasters, showing the thermal conductivity is strongly correlated with bulk density of the sample and lower density indicates lower thermal conductivity.

Figures 8C, 8D:
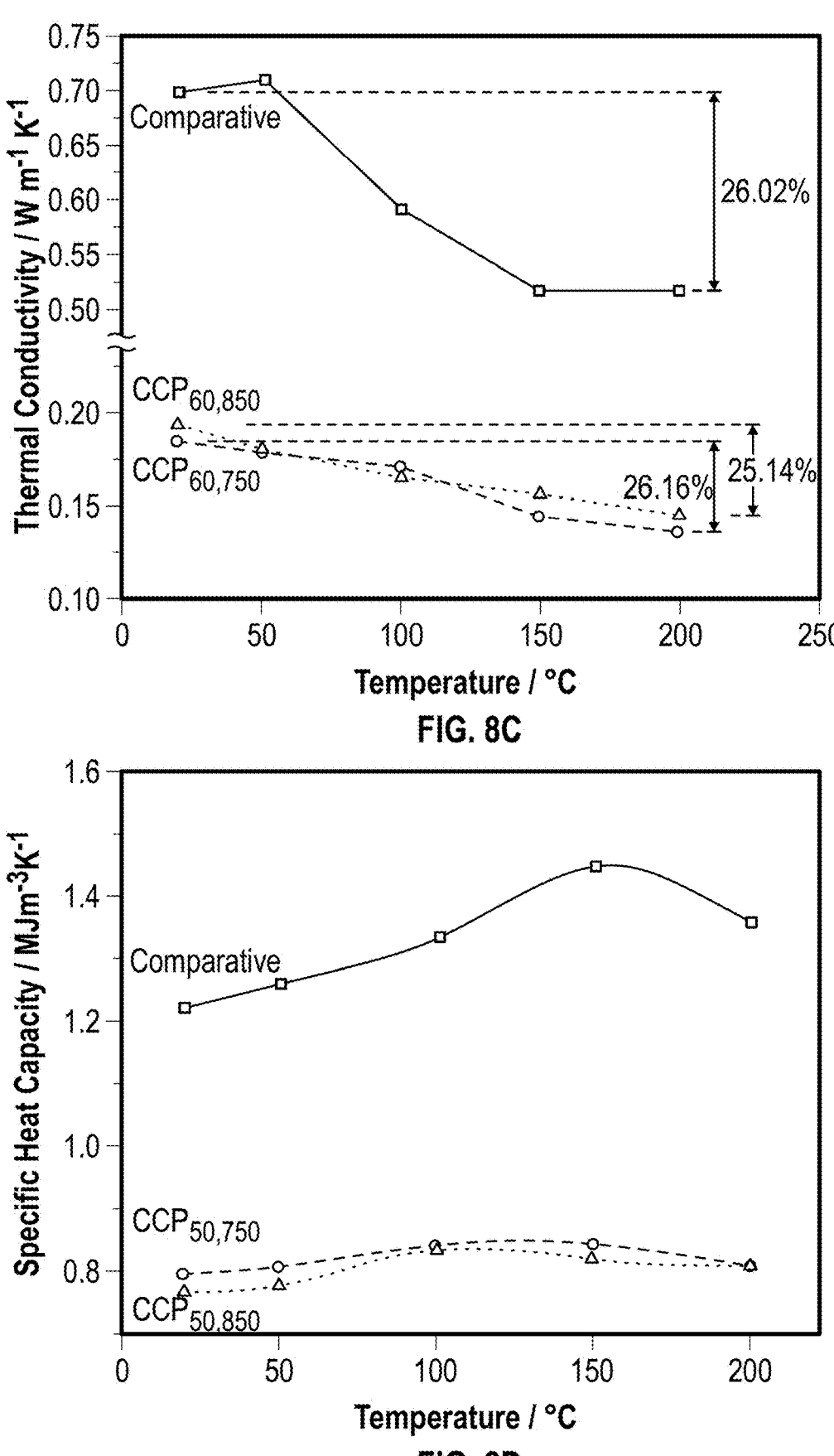
FIG. 8C is a graph illustrating the thermal conductivity variation of the example char clay plasters and a comparative plaster as a function of temperature according to at least one embodiment of the present disclosure.
FIG. 8D is a graph illustrating the specific heat capacity variation of the example char clay plasters and a comparative plaster as a function of temperature according to at least one embodiment of the present disclosure.

The relationship between thermal conductivity and temperature for example char clay plasters and a comparative plaster is illustrated in FIG. 8C. The data depicts a significant drop in thermal conductivity with an increase in temperature for the example char clay plasters and the comparative plaster. The thermal conductivity reduction with an increase in temperature is likely attributable to the existence of free water and/or chemically-bonded water in the example char clay plasters and the comparative plaster. The rising temperature results in the gradual removal of the moisture in the pores and the replacement of the space with air. As such, the thermal conductivity decreases by about 26.02%, about 26.16%, and about 25.14% with increasing temperature for the comparative plaster, $CCP_{60,750}$, and $CCP_{60,850}$, respectively.

The specific heat capacity as a function of temperature for example char clay plasters ($CCP_{50,750}$ and $CCP_{50,850}$) and a comparative plaster is shown in FIG. 8D. In the temperature range of about 25° C. to about 200° C., a significant amount of heat is used to remove the free water and/or hydrated water that is thermally-bonded to the organic particles of the plaster. The peak between about 100° C. and about 150° C. indicates that free water evaporates predominantly within this temperature range. When increasing the temperature to about 200° C., the specific heat capacity of $CCP_{50,750}$ and $CCP_{50,850}$ decreases, indicating that the water is completely removed and the plaster itself contributes to the heat storage capability. In addition, the specific heat capacity of the example char clay plasters is also lower than that of the comparative plaster, resulting from the low bulk density of the char clay plaster.

Figure 10A:
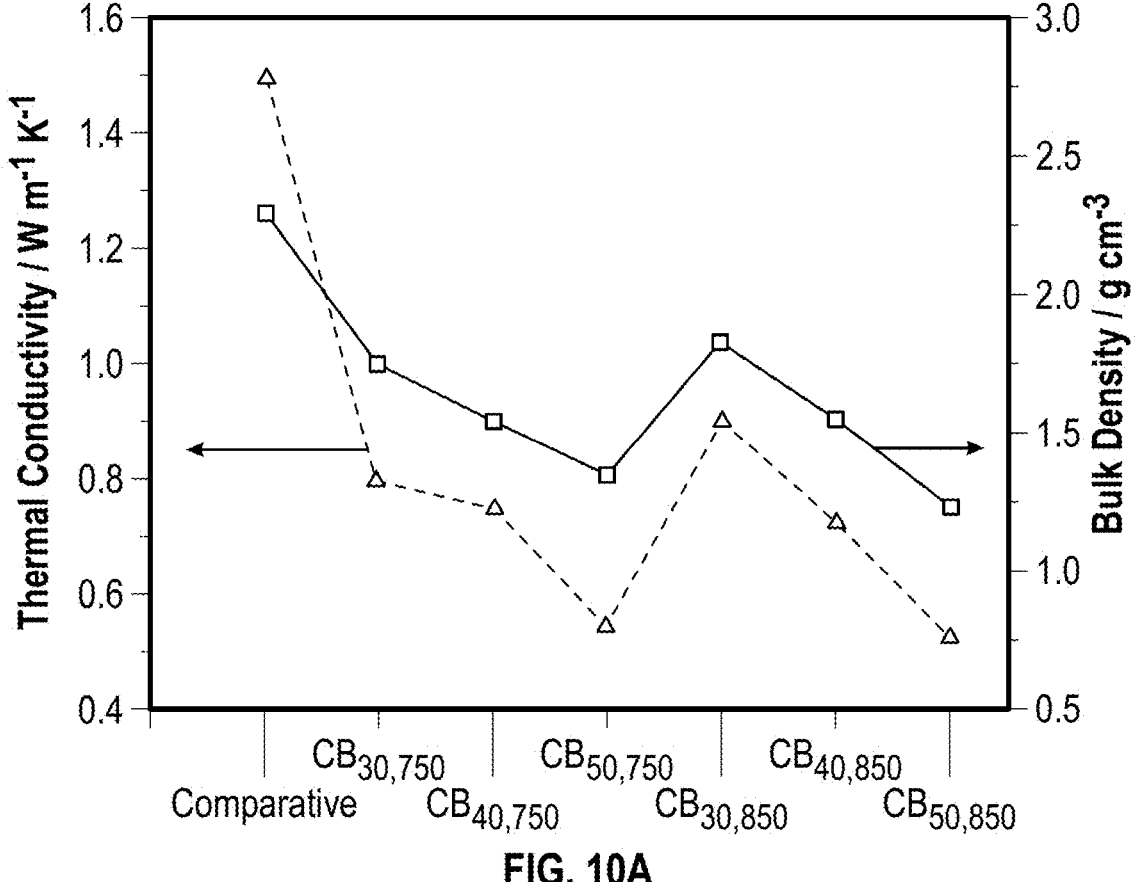
FIG. 10A is a graph illustrating the thermal conductivity performance of example char bricks according to at least one embodiment of the present disclosure.
Figures 10B, 10C:
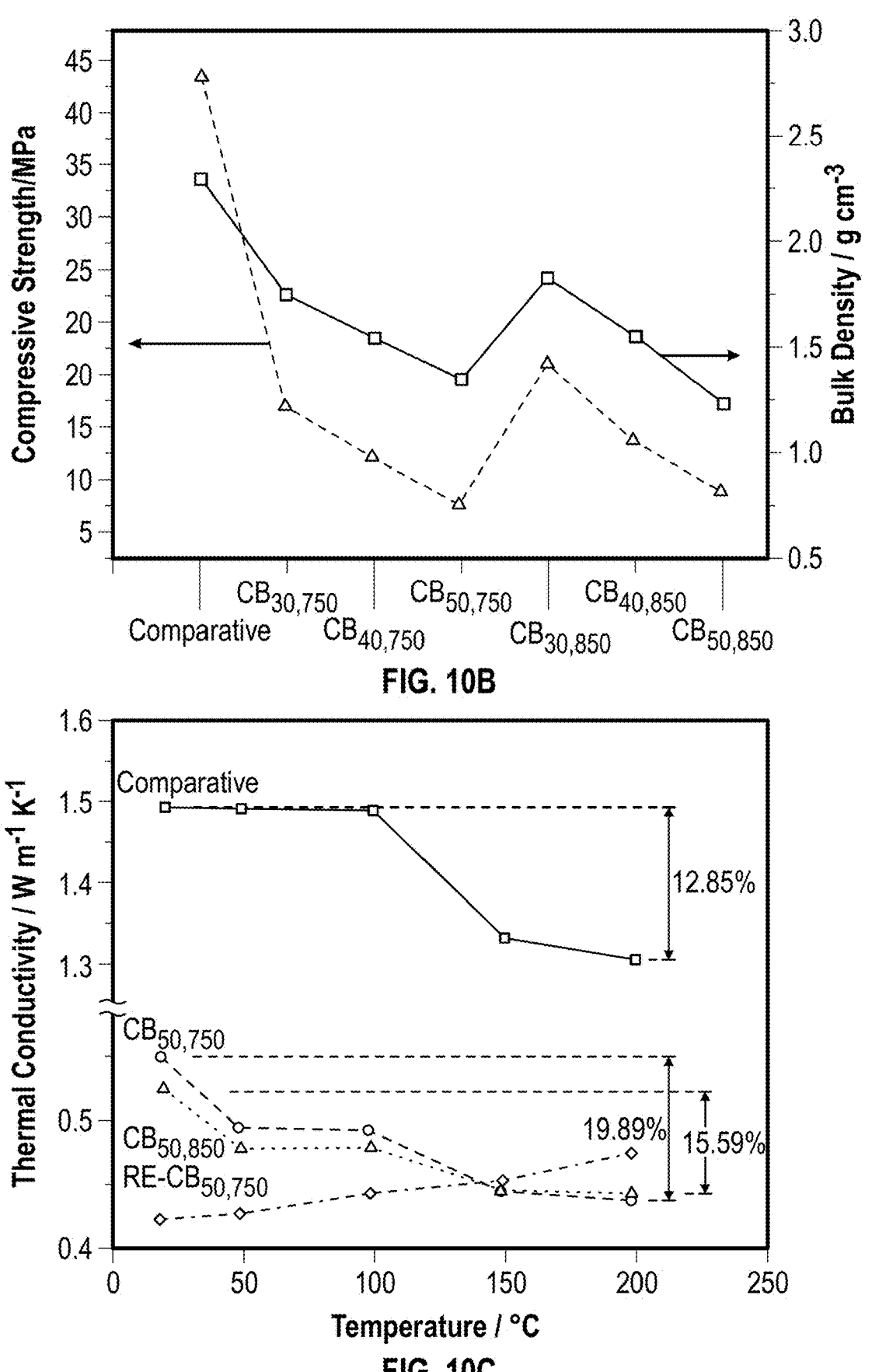
FIG. 10B is a graph illustrating the compressive strength of example char bricks according to at least one embodiment of the present disclosure.
FIG. 10C is a graph illustrating the thermal conductivity variation of example char bricks and a comparative brick as a function of temperature according to at least one embodiment of the present disclosure.

FIG. 10A, FIG. 10B, and Table 5 show various physical and mechanical properties of example char bricks. As described above, the char bricks include pyrolysis char. An intentional effect of incorporating pyrolysis char into char brick is a significant reduction in the bulk density, which is attributable to the high porosity of the pyrolysis char. This attribution is demonstrated in FIG. 6 which graphically represents the BET specific surface area of pyrolysis chars.

TABLE 5

Physical and Mechanical Properties of Example Char Bricks

| Specimen | Thermal conductivity (W m$^{-1}$ K$^{-1}$) | Compressive strength (MPa) | Bulk density* (g cm$^{-3}$) |
|---|---|---|---|
| Comparative Brick | 1.4940 | 43.68 | 2.29 |
| $CB_{30, 750}$ | 0.8040 | 15.50 | 1.76 |
| $CB_{40, 750}$ | 0.7530 | 11.30 | 1.55 |
| $CB_{50, 750}$ | 0.5484 | 7.28 | 1.36 |
| $CB_{30, 850}$ | 0.8998 | 19.10 | 1.83 |
| $CB_{40, 850}$ | 0.7280 | 12.60 | 1.56 |
| $CB_{50, 850}$ | 0.5240 | 8.37 | 1.24 |

*Bulk density is calculated from the mass/volume ratio of the specimens.

Figure 9B:
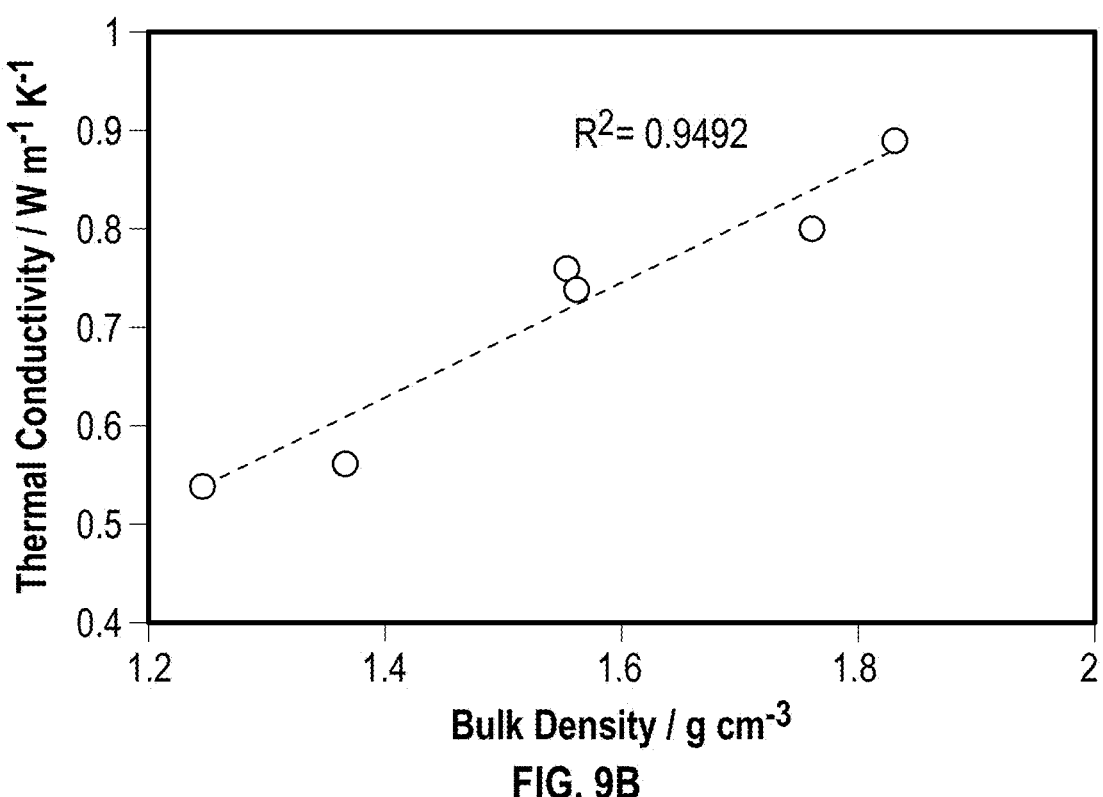
FIG. 9B is a graph illustrating the relationship between thermal conductivity and bulk density of example char bricks according to at least one embodiment of the present disclosure.

The density of the example char bricks is reduced by about 40.5% to about 45.9% relative to the comparative brick when 50 wt % of sand is replaced by pyrolysis char materials ($CB_{50,750}$ and $CB_{50,850}$ sample). As a result, the corresponding thermal conductivity is reduced by about 63.3 to about 64.9% relative to the comparative brick. Moreover, and as shown in FIG. 9B, the thermal conductivity of the example char bricks mathematically correlates to their bulk density ($R^2=0.9492$), showing that the thermal conductivity is highly correlated with its bulk density.

The porosity and the reduction in bulk density improves the insulation properties of the as-fabricated char bricks and produces a much lower thermal conductivity for example $CB_{50,750}$ (about 0.5484 W m$^{-1}$ K$^{-1}$) and example $CB_{50,850}$ (0.5240 W m$^{-1}$ K$^{-1}$) compared to the comparative brick (about 1.4940 W m$^{-1}$ K$^{-1}$). When the weight ratio of pyrolysis char in the char brick decreases to about 30%, the compressive strength increases to about 19.1 MPa ($CB_{30,850}$). However, there is a trade-off between the mechanical property and insulation property, meaning that the thermal conductivity of the brick can be balanced by adjusting the mass ratio of pyrolysis char.

FIG. 10C demonstrates the thermal conductivity of the comparative brick, $CB_{50,750}$, and $CB_{50,850}$ which decreases by about 12.85%, about 19.89%, and about 15.59%, respectively as the temperature increases to about 200° C. This is attributable to the removal of moisture, including free water and/or chemically-bonded water, in the samples. However, other conventional insulating materials such as fiberglass, rock-wool, extruded polystyrene and refractory brick have a different kinetic thermal conductivity because of the difference in their composition and morphology. The aforementioned conventional materials are either non-porous or fabricated under extremely high temperature so that there is not a substantial amount of free water and/or chemically-bonded water in these materials. The thermal conductivity therefore increases with increasing temperature because the thermal conductivity is strongly influenced by heat radiation and phonon conduction under these circumstances. As a result, the insulation property of char bricks in general condition will further improve a little, e.g., 10-20%, when the temperature increases to about 200° C., showing reverse thermal behavior compared to other conventional insulation materials.

Figure 10D:
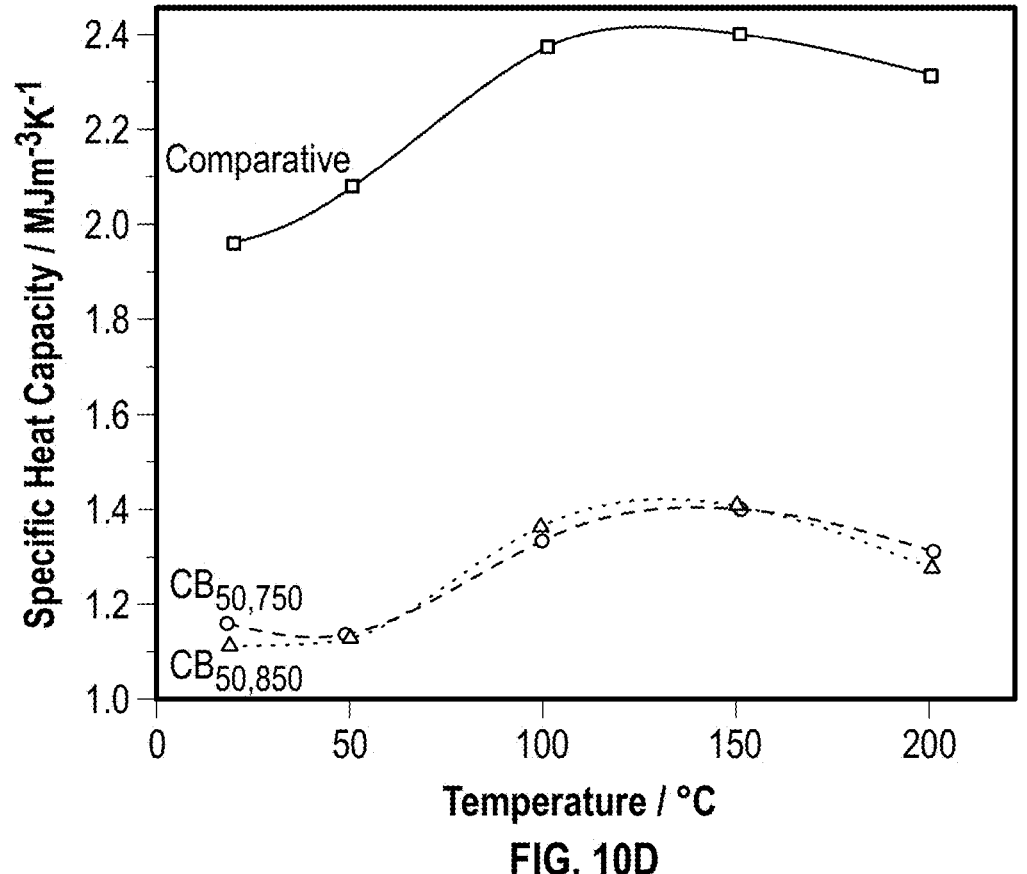
FIG. 10D is a graph illustrating the specific heat capacity variation of example char bricks and a comparative brick as a function of temperature according to at least one embodiment of the present disclosure.

When another thermal property test is carried out immediately after the thermal conductivity test with increasing temperature to about 200° C. on the char brick, the thermal conductivity of $CB_{50,150}$ increases with increasing temperature, as shown for $RE\text{-}CB_{50,750}$ in FIG. 10C. This occurs because a majority of the moisture in the specimen has been removed. This phenomenon also supports the fact that thermal conductivity strongly depends on the moisture content in the char bricks. After the removal of moisture, the temperature-dependent thermal conductivity of the example char bricks is consistent with that of conventional insulating materials such as fiberglass, rock-wool, extruded polystyrene, and refractory brick. In FIG. 10D, the specific heat capacity of the example char bricks as a function of temperature is similar to that of the example char clay plasters (FIG. 8D), showing a peak between about 100° C. and about 150° C. where the moisture evaporates.

Example 5: Paint Performance on Char Bricks

Figure 11:
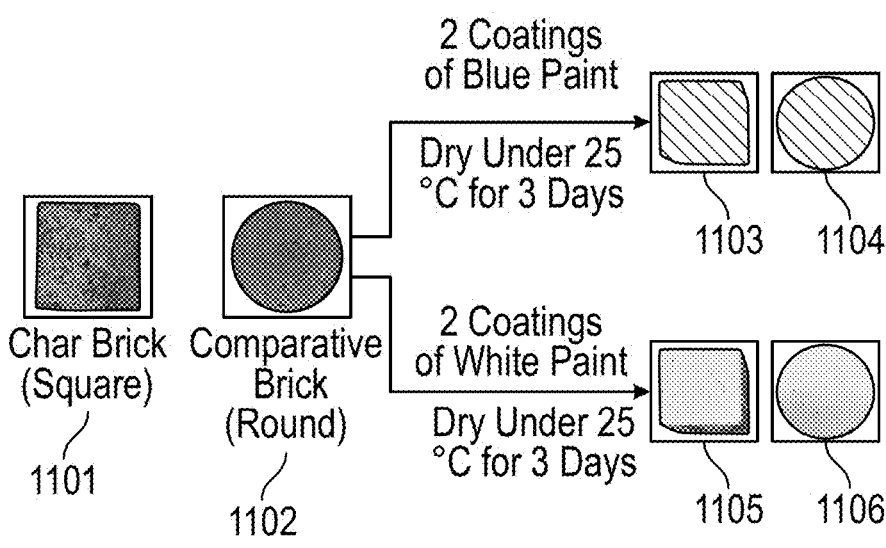
FIG. 11 is an illustration of an example painting process according to at least one embodiment of the present disclosure.

A paint performance test was carried out to investigate the adhesion strength of commercial paint/coating on an example char brick and a comparative brick. As shown in FIG. 11, two different types of paints were utilized for the paint performance test—an oil-based paint (blue) and a water-based paint (white). Two coats were applied to the surface of the example and the comparative. Example 1103 and example 1105 refer to the example char bricks coated with oil-based paint and water-based paint, respectively. Example 1104 and example 1106 refer to comparative bricks coated with oil-based paint and water-based paint, respectively. The painted samples are placed under a temperature of about 25° C. for about 3 days or until the coats are completely dried. The adhesion strength of the paint on the brick is monitored through a quantitative pull-off test. The quantitative pull-off test conforms to ASTM D7234. Table 6 shows the results of the paint performance test.

TABLE 6

| Paint Adhesion Test Results for Example Char Bricks | | | | | | Avg. Value (MPa) |
|---|---|---|---|---|---|---|
| | Example | | Adhesion Strength (MPa) | | | |
| Char Brick | 1103 | Oil-based paint | 0.11 | 0.10 | 0.10 | 0.10 |
| | 1105 | Water-based paint | 1.55 | 1.56 | 1.52 | 1.54 |
| Comparative Brick | 1104 | Oil-based paint | 0.10 | 0.09 | 0.12 | 0.11 |
| | 1106 | Water-based paint | 1.69 | 1.67 | 1.66 | 1.68 |

Overall, the test results demonstrate that the adhesion strength of paint to the surface of the example char bricks is comparable to that of the comparative brick—about 8% and about 9% reduction for the water-based paint and the oil-based paint, respectively. Accordingly, the adhesion test demonstrates that the example char bricks have similar coating performance as that of the comparative brick for commercial use, and water-based paint can provide superior performance depending on the application.

Example 6: Particle-Size Impact on Char Brick Properties

Figure 12:
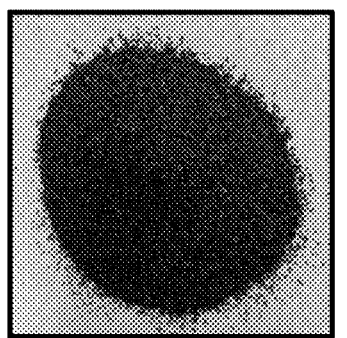
FIG. 12 shows images of example char bricks having different particle sizes according to at least one embodiment of the present disclosure.
Figure 12:
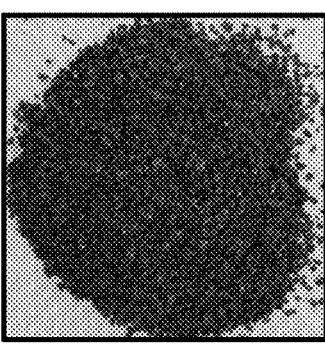
Figure 12:
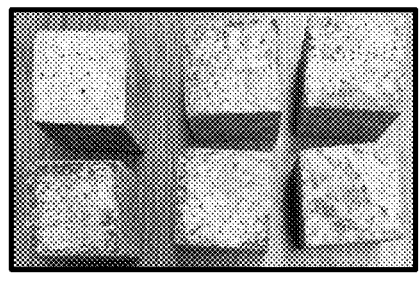
Figure 12:
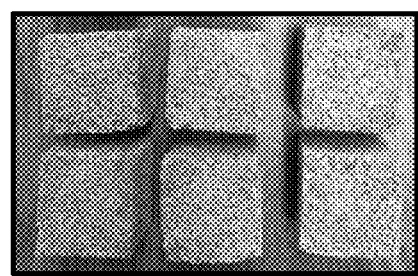

In order to investigate the particle-size (PZ) impact on the textural properties of the example char bricks, two different particle sizes of the pyrolysis chars were obtained by sieving. The particle sizes are (a) below about 0.6 mm and (b) between about 0.6 mm and about 1.18 mm. These two pyrolysis chars of different particles sizes were utilized to prepare char bricks, CB-0.6 and CB-1.18, as shown in FIG. 12.

To prepare the pyrolysis char particles, a crude char sample pyrolyzed at about 850° C. (with an average particle size of about 5 mm) was sieved by mesh size of 30 for (a) and mesh size of 16 for (b).

Figure 13A:
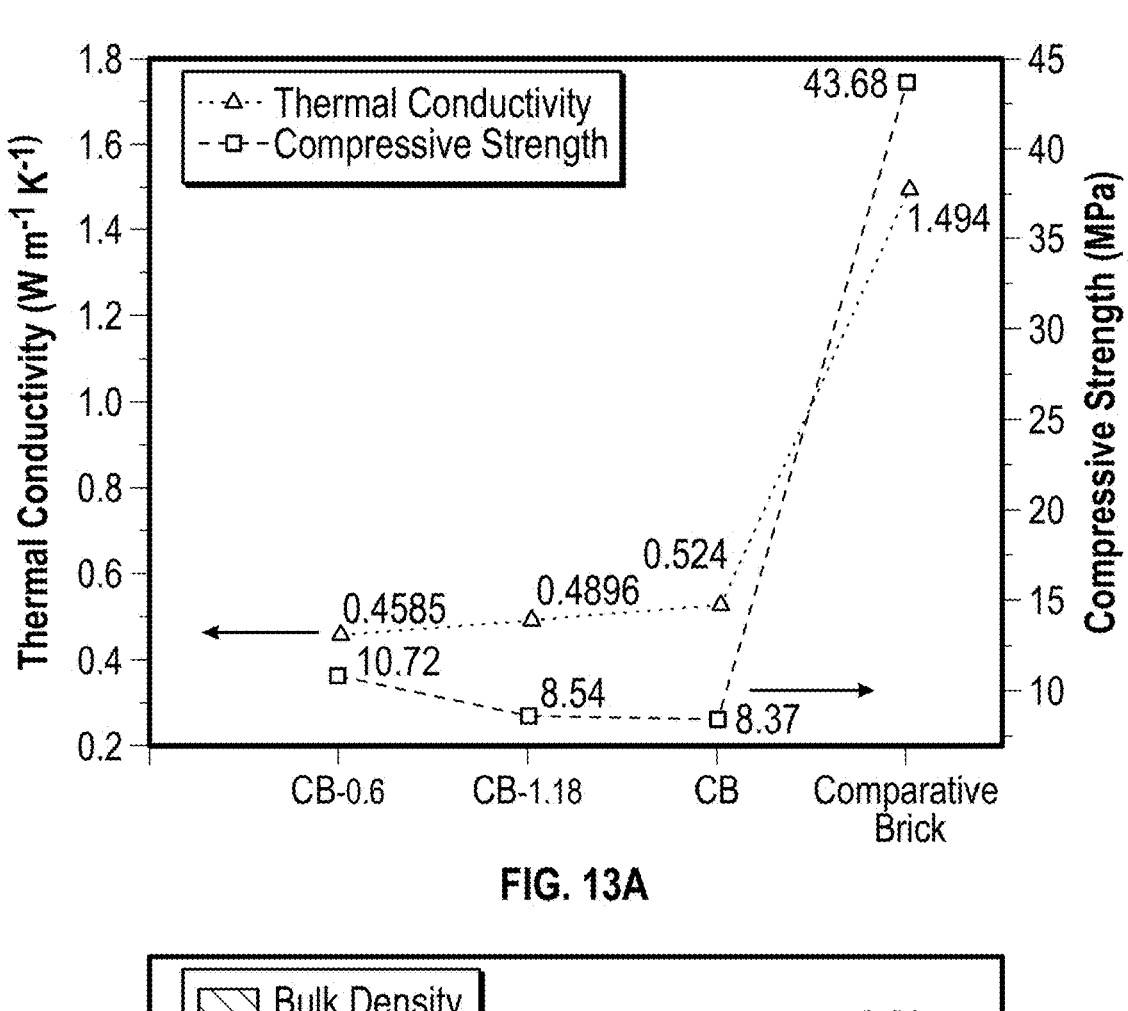
FIG. 13A is a graph illustrating the thermal conductivity and compressive strength of example char bricks and a comparative brick according to at least one embodiment of the present disclosure.

FIG. 13A is a graph illustrating the thermal conductivity and compressive strength of example char bricks prepared from the pyrolysis chars of different particle size. CB-0.6 refers to example char brick made of pyrolysis char particles having a size of less than about 0.6 mm. CB-1.18 refers to example char brick made of pyrolysis char particles having a size of between about 0.6 mm and about 1.18 mm. CB refers to char brick made of pyrolysis char particles having a size less than about 5 mm. The comparative brick was made of sands/gravels having a size of less than about 5 mm.

The example char bricks made of sieved pyrolysis chars (CB-0.6 and CB-1.18) provide about a 10% improvement relative to CB in terms of thermal conductivity and compressive strength. The thermal conductivity decreases from about 0.52 W m$^{-1}$ K$^{-1}$ to about 0.45 W m$^{-1}$ K$^{-1}$, showing that the reduced particle sizes improves insulation properties. Further, the compressive strength increases from about 8.37 MPa to about 10.72 MPa as the particle size is reduced. The sieving process will impact brick performance, but the improvement in thermal properties, noise abatement, and weight savings, becomes insignificant when the particle size is less than 1.18 mm, however the compressive strength continues to improve as bulk density increases. In certain applications, the optimized particle size for char brick fabrication can be in the range of 0.6-5 mm.

Figure 13B:
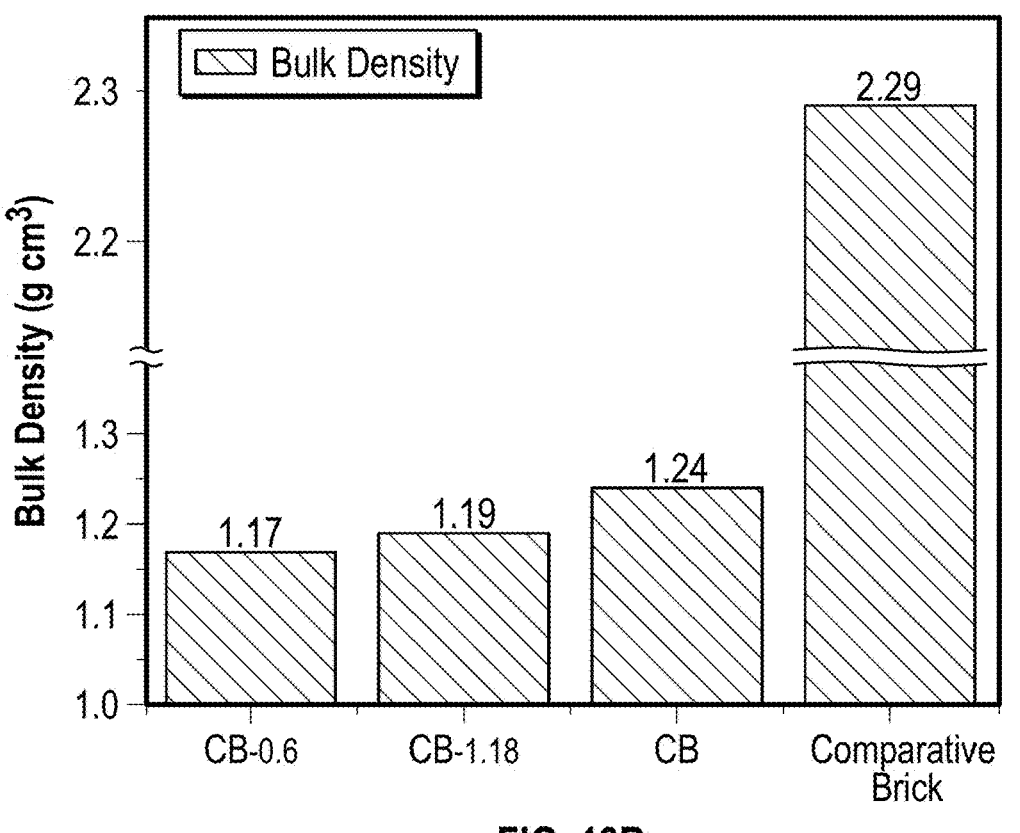
FIG. 13B is a bar graph illustrating the bulk density of example char bricks and a comparative brick according to at least one embodiment of the present disclosure.

FIG. 13B is a bar graph illustrating the bulk density of example char bricks—CB-0.6, CB-1.18, and CB—and a comparative brick. The bulk density of the CB-0.6, CB-1.18 and CB sample is 1.17 g cm$^{-3}$, 1.19 g cm$^{-3}$, and 1.24 g cm$^{-3}$, respectively, indicating that the particle size of the char brick typically does not dramatically impact the overall bulk density of the char brick.

Example 7: Moisture Absorption Behavior of Char Bricks

Figures 14A, 14B:
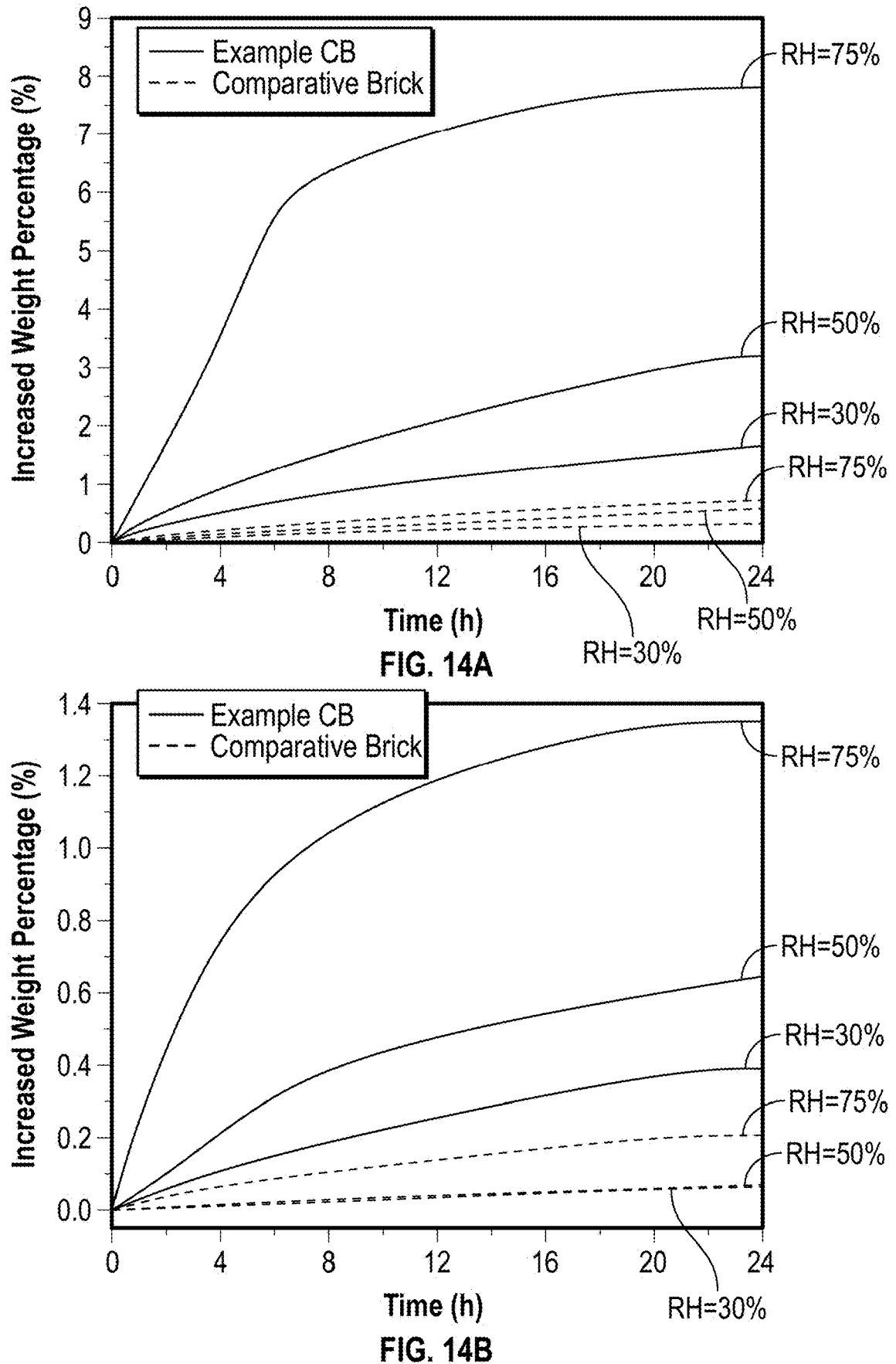
FIG. 14A is a graph illustrating the moisture absorption behavior of example char bricks and a comparative brick according to at least one embodiment of the present disclosure.
FIG. 14B is a graph illustrating the moisture absorption behavior of example char bricks covered with foil on five sides and a comparative brick covered with foil on five sides according to at least one embodiment of the present disclosure.

The performance of the example char bricks in response to water/moisture is a factor for its use in building materials. Indoor moisture can be absorbed by the char bricks in a high relative humidity environment, and conversely the water can be released to humidify the indoor air in a dry environment. Some negative impacts can arise when the moisture is absorbed into the internal structure of bricks. Too much moisture in the brick can give rise to vapor condensation under various weather conditions. For example, vapor condensation in colder weather can lead to the freezing of water and in warmer weather can lead to mold. Hence, water vapor absorption behavior of char brick and conventional brick was investigated, as shown in FIG. 14A and FIG. 14B. Overall, the absorption/desorption kinetics of example char bricks described herein results in an indoor humidity regulation effect, in comparison to conventional bricks.

The procedure for measuring the moisture absorption behavior is described in above. For samples used to plot FIG. 14B, both the comparative brick and the char brick samples are covered with tin foil on 5-sides and one-surface (e.g., the length and width surface) is exposure to moist air during moisture absorption measurement while the bare samples are used for generating FIG. 14A.

For the data in FIG. 14A, an example char brick (bare; without foil) is used to determine the moisture absorption behavior of the char brick relative to a comparative brick. For the data in FIG. 14B, an example char brick (covered with tin foil on 5-sides) are also used to determine the moisture absorption behavior of the char brick relative to a comparative brick. In buildings, the concrete brick products typically have one surface exposure to indoor environment. Foil covering five sides of the example char brick and comparative brick is used to mimic such real conditions. The example char brick and comparative char brick used for the moisture absorption tests in FIGS. 14A and 14B was prepared by the methods described above.

In the moisture absorption test, the increased weight percentage was measured as a function of time at relative humidity (RH) values of 30%, 50%, and 75%. As shown in FIG. 14A and FIG. 14B, the example char brick displays a more significant moisture absorption behavior, either with or without foil, relative to the comparative brick. The data shows that the example char brick can be used as, e.g., a building material where moisture adjustments of indoor environments is desired. In addition, such moisture-adjustment regulation can impart a cost savings in terms of building energy use.

As shown in FIG. 14B, the foil-covered example char brick absorbs up to about 1.3% of moisture under 75% relative humidity after 24 hours, while the foil-covered comparative brick only absorbs about 0.2% under the same conditions. As such, the example char brick has, e.g., superior humidity regulation capabilities over the comparative brick. The superior performance in humidity regulation of the example char brick is also observed at relative humidity of 50% and 30%.

Figure 15:
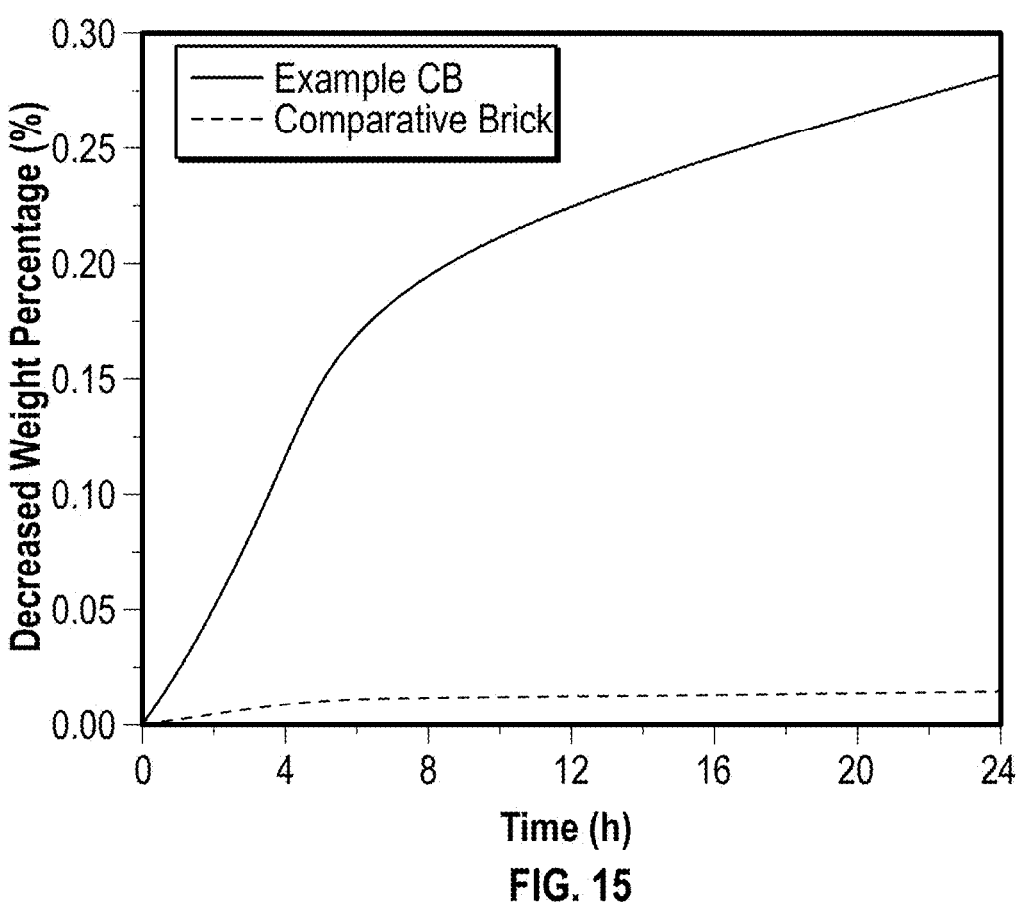
FIG. 15 is a graph illustrating the water desorption behavior of an example char brick covered with foil on five sides and a comparative brick sample covered with foil on five sides according to at least one embodiment of the present disclosure.

The improved performance in humidity regulation of the example char brick, relative to the comparative brick, is also indicated by the moisture desorption behavior in FIG. 15. Five sides of the example char brick and the comparative brick were covered with foil. The example char brick and comparative brick used for the moisture desorption test were prepared as described above. The moisture desorption is measured by placing the moisture-saturated char brick sample into a 30% relative humidity environment for 24 hours and the desorbed moisture mass is obtained by the weighting difference before and after the 24 hours treatment.

The decreased weight percentage of the foil-covered example char brick and the foil-covered comparative brick from 75% RH to 30% RH in 24 hours is about 0.28% and about 0.01%, respectively. For both the example char brick and the comparative brick, the amount of moisture absorption is significantly larger than the amount of moisture desorption, indicating a portion of the absorbed moisture still remains in the pores of the bricks. The remaining moisture in the bricks suggests that, at a temperature of about 30° C., the moisture desorption rate is slower than its absorption rate.

Example 8: Physical and Textural Properties of Example Char Brick, Comparative Brick, and Comparative Lightweight Brick The density, thermal conductivity, and mechanical strength of an example char brick are compared to that of two commercial concrete products—a comparative brick and a comparative lightweight brick. The comparative brick was prepared by the procedure described above. The lightweight brick is made of expanded shale that is porous with a porosity of 60% and light weight. The fabrication ingredients of lightweight brick are 11 wt % of cement, 44 wt % of sand, and 45 wt % of expanded shale. The curing process for the lightweight brick is a temperature of 100-120° F. and a relative humidity of 60-80% for at least 24 hours.

The results in Table 7 demonstrate that the example char brick has better insulation properties and a lower bulk density than both comparative bricks. In addition, the mechanical strength decreases as a result of the incorporation of pyrolyzed chars. The example char brick also exhibits improved insulation properties compared to the comparative lightweight brick specimen in addition to being relatively lightweight (about 1.24 g cm$^{-3}$). The results indicate the superior thermal insulation properties and lightweight features of the example char brick.

TABLE 7

Physical and Textural Properties of
Example Bricks and Comparative Bricks

|  | Comparative brick | Comparative Lightweight brick | Example Char Brick |
| --- | --- | --- | --- |
| Density, g cm$^{-3}$ | 2.08 | 1.68 | 1.24 |
| Thermal conductivity, W m$^{-1}$ K$^{-1}$ | 1.33 | 0.68 | 0.52 |
| Mechanical strength, MPa | 40.48 | 31.70 | 8.37 |

In addition to the physical and textural properties of the char bricks described herein, the char bricks can enable cost savings when used as a building material relative to conventional bricks. For example, a competitive commercial product in market of our char product is lightweight brick made from expanded shale instead of gravel/sand. The expanded shale is generated through the crushing and heating of shale, processing porous and lightweight feature so to be utilized as an alternative of comparative sand/gravel for the brick production. The substitution of high-cost expended shale with pyrolysis char can significantly reduce the cost of building materials. Moreover, in terms of carbon capture and storage, coal-based building products are fabricated with a low carbon footprint. Instead of separating carbon dioxide from coal-fired power stations and storing it underground, the carbon from coal can be stored in the buildings and houses in a beneficial manner.

Example 9: Dry Wall-Supported Char Clay Plaster

Plaster is typically used as a protective and/or decorative coating of walls and ceilings. Plaster has little-to-no mechanical strength and typically cannot be utilized as a free-standing structure. Instead, plaster is typically applied to dry wall.

Figure 16:
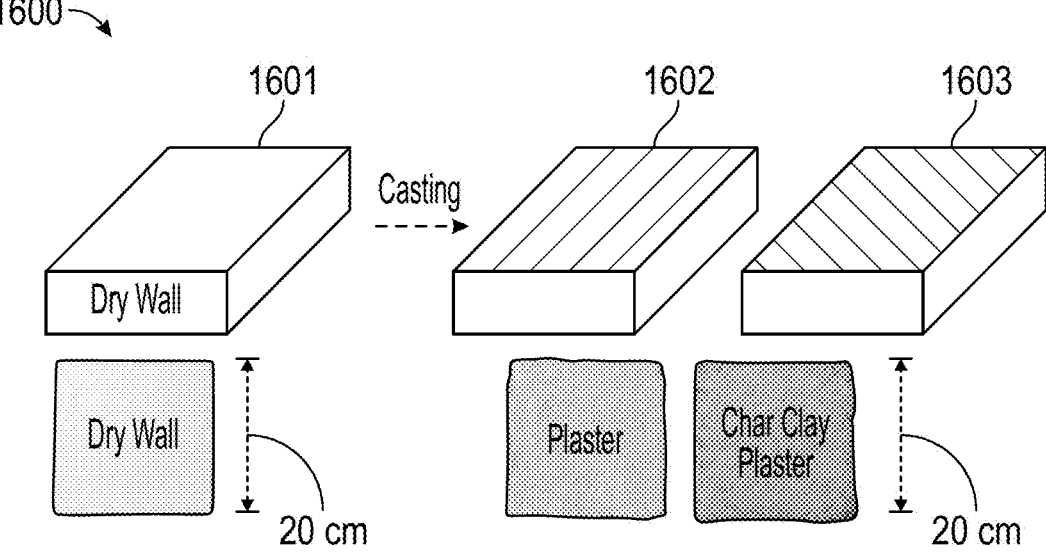
FIG. 16 is an illustration of an example fabrication process of char clay plaster over dry wall according to at least one embodiment of the present disclosure.

FIG. 16 is an illustration of an example fabrication process 1600 of char clay plaster over dry wall according to the following procedure. The dry wall 1601 has a length of about 20 cm. The fabrication process of dry wall-supported char clay plaster is carried out following the method described above. The dry wall is used to support the plaster materials. Pyrolysis char is added into mixtures of clay and water to replace sand to form the char clay plaster. The weight ratio of clay remains constant (20%). The char clay plaster (CCP) is then placed on the dry wall to form example dry wall-supported CCP 1603. The fabrication process of comparative dry wall-supported plaster was based on the method described above. In this process, the dry wall is used to support the plaster materials.

The results in Table 8 indicate that the properties of example dry wall-supported CCP is close to the CCP alone. Moreover, when the CCP is applied over the dry wall, the thermal insulation, water absorption, and water desorption properties of the example dry wall-supported CCP 1603 is enhanced over the comparative dry wall-supported plaster 1602 by about 61%, about 50%, and about 64%, respectively. In both cases—with or without dry wall support—the comparative plaster has a higher thermal conductivity and lower moisture absorption/desorption ability, suggesting that comparative plaster has a relatively poorer thermal insulation and moisture buffering properties compared to example CCP.

TABLE 8

| Performance of Example Dry Wall-Supported Char Clay Plaster | | | |
|---|---|---|---|
| | Comparative Plaster | Example CCP | Improvement |
| Thermal conductivity, W m$^{-1}$ K$^{-1}$ | 0.69 | 0.26 | 62% |
| Absorbed Moisture, % | 6.5 | 10.9 | 67% |
| Desorbed Moisture, % | 5.9 | 9.8 | 66% |
| | Comparative Dry Wall-Supported Plaster (1602) | Example Dry Wall-Supported CCP (1603) | Improvement |
| Thermal conductivity, W m$^{-1}$ K$^{-1}$ | 0.65 | 0.25 | 61% |
| Absorbed Moisture, % | 8.7 | 13.0 | 50% |
| Desorbed Moisture, % | 5.1 | 8.4 | 64% |

As described herein, a novel and economical approach for fabrication of highly insulating building materials provides a comprehensive process for coal conversion by utilizing pyrolysis chars. Benefitting from, e.g., high porosity, ample micropore channels, and chemically-stable features, high-temperature pyrolysis char is then utilized as a cost-effective substitution for fabrication of building materials (char clay plaster, char brick, and foam glass). The results demonstrate that pyrolysis char-derived building materials exhibit enhanced insulation properties, unique moisture buffering properties, and lower bulk densities compared to the comparative or other comparable conventional building products. In comparison to other pore-creating methods frequently involving high-temperature procedures or purified reagents, the pyrolysis chars are utilized to incorporate pores on the building materials without any additional process modification. In addition, the low cost of pyrolysis char utilized to fabricate various building materials described herein is believed to provide various economic benefits while providing substantial environmental benefits in the form coal conversion.

The descriptions of various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable one of ordinary skill in the art to understand the embodiments disclosed herein.

For purposes of this present disclosure, and unless otherwise specified, all numerical values within the detailed description and the claims herein are modified by "about" or "approximately" the indicated value, and consider experimental error and variations that would be expected by a person having ordinary skill in the art. For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

As used herein, the indefinite article "a" or "an" shall mean "at least one" unless specified to the contrary or the context clearly indicates otherwise.

While the foregoing is directed to embodiments of the present disclosure, other and further embodiments of the disclosure may be devised without departing from the basic scope thereof, and the scope thereof is determined by the claims that follow.

What is claimed is:

1. A method, comprising:
   providing a coal-based material, wherein said coal-based material is at least partially derived from coal;
   thermo-chemically processing said coal-based material, comprising:
      performing a solvent extraction process on said coal-based material, wherein the solvent extraction process comprises:
         contacting said coal-based material with one or more solvents under solvent extraction conditions for generating light volatiles and coal extraction residue (CER) at a pressure of about 200 psi to about 300 psi; and
      performing a pyrolysis process on said CER for generating liquid oil and pyrolysis char (PC); and
   separating a chemical feedstock or an engineered product.

2. The method of claim 1, wherein the contacting step comprises extracting said coal-based material with said one or more solvents, chemically reacting said coal-based material with said one or more solvents, or any combination of thereof.

3. The method of claim 1, wherein said one or more solvents are one or more of an aliphatic solvent, an aromatic solvent, a polar solvent, a hydrogen donating solvent, or a combination of these.

4. The method of claim 1, wherein the said one or more solvents are tetralin (1,2,3,4-Tetrahydronaphthalene), 1-methyl-naphthalene, dimethylformamide, dimethyl sulfoxide, toluene or any combination thereof.

5. The method of claim 1, wherein said one or more solvents is a pure solvent.

6. The method of claim 1, wherein said one or more solvent is a mixed solvent.

7. The method of claim 1, wherein contacting said coal-based material with one or more solvents is carried out for a duration selected from a range of 30 minutes to 10 hours.

8. The method of claim 1, wherein contacting said coal-based material with one or more solvents is carried out at a temperature selected from a range of 300° C. to 500° C.

9. The method of claim 1, wherein the pyrolysis process is performed under pyrolysis conditions, comprising: a non-reactive gas atmosphere;
   a temperature of greater than 450° C.; and
   a pressure of less than about 1.1 atm.

10. The method of claim 1, wherein the liquid oils include cresol, phenols, and other carbonaceous materials.

11. The method of claim 1, further comprising processing the liquid oil to make petrochemicals or engineered materials.

12. The method of claim 11, wherein the engineered materials comprise asphalt paving, asphalt roofing, base oils, carbon fiber, polymeric resins, and coatings.

13. The method of claim 1, wherein the pyrolysis process further comprises calcining the pyrolysis char to form coal ash.

14. The method of claim 1, wherein the engineered product is a non-fuel products.

15. The method of claim 14, wherein the engineered product includes one or more of a polymeric resin, asphalt paving, asphalt roofing, graphene, carbon fiber, soil amendments, building materials, or combinations thereof.

16. A method, comprising:

providing a coal-based material, wherein the coal-based material is at least partially derived from coal; and processing said coal-based material, wherein said processing step includes a combination of pyrolysis and solvent extraction, wherein solvent extraction is performed at a pressure of about 200 psi to about 300 psi;

wherein said pyrolysis and solvent extraction are integrated and carried out under conditions for generating light volatiles, liquid oil, and coal extraction residue (CER).

17. The method of claim 16, wherein processing said coal based material is performed at a pressure selected from a range of about 1.1 atm or less.

18. The method of claim 16, wherein said pyrolysis is performed at a temperature selected from a range of 450° C. to 950° C.

19. The method of claim 16, wherein said pyrolysis further comprises calcining the pyrolysis char to form coal ash.

20. The method of claim 16, wherein said solvent extraction is performed with at least one liquid solvent.

21. The method of claim 20, wherein said one or more solvents are one or more of an aliphatic solvent, an aromatic solvent, a polar solvent, a hydrogen donating solvent, or a combination of these.

22. The method of claim 20, wherein said solvent extraction is performed with at least two liquid solvents.

23. The method of claim 22, wherein a first solvent is a polar solvent and a second solvent is a hydrogen donating solvent or vice versa.

24. The method of claim 16, wherein said solvent extraction is a single stage solvent extraction, multiple single stage solvent extractions, a single multistage solvent extraction, multiple multistage solvent extractions or a combination of single stage and multistage solvent extractions.

25. The method of claim 16, wherein the said one or more solvents are tetralin (1,2,3,4-Tetrahydronaphthalene), 1-methyl-naphthalene, dimethylformamide, dimethyl sulfoxide, toluene or any combination thereof.

26. The method of claim 16, wherein at least one of the light volatiles is a chemical feedstock or an engineered product.

27. The method of claim 26, wherein the engineered product is a non-fuel product.

28. The method of claim 27, wherein the engineered product is one or more of a polymeric resin, asphalt paving, asphalt roofing, graphene, carbon fiber, soil amendments, building materials, or combinations thereof.

* * * * *